United States Patent
Liang et al.

(10) Patent No.: US 12,141,995 B2
(45) Date of Patent: Nov. 12, 2024

(54) SYSTEMS AND METHODS FOR SIMULATING DYNAMIC OBJECTS BASED ON REAL WORLD DATA

(71) Applicant: Aurora Operations, Inc., Pittsburgh, PA (US)

(72) Inventors: Ming Liang, Toronto (CA); Wei-Chiu Ma, Toronto (CA); Sivabalan Manivasagam, Toronto (CA); Raquel Urtasun, Toronto (CA); Bin Yang, Toronto (CA); Ze Yang, Toronto (CA)

(73) Assignee: AURORA OPERATIONS, INC., Pittsburgh, PA (US)

( * ) Notice: Subject to any disclaimer, the term of this patent is extended or adjusted under 35 U.S.C. 154(b) by 539 days.

(21) Appl. No.: 17/388,372

(22) Filed: Jul. 29, 2021

(65) Prior Publication Data

US 2022/0036579 A1 Feb. 3, 2022

Related U.S. Application Data

(60) Provisional application No. 63/058,052, filed on Jul. 29, 2020.

(51) Int. Cl.
*G06K 9/00* (2022.01)
*G06N 20/00* (2019.01)
(Continued)

(52) U.S. Cl.
CPC ............... *G06T 7/70* (2017.01); *G06N 20/00* (2019.01); *G06T 17/20* (2013.01); *G06V 40/23* (2022.01)

(58) Field of Classification Search
CPC . G06T 7/70; G06T 17/20; G06T 2207/10016; G06T 2207/10028;
(Continued)

(56) References Cited

U.S. PATENT DOCUMENTS

2021/0096241 A1* 4/2021 Bongio Karrman .... G01S 13/42
2021/0287430 A1* 9/2021 Li ........................ G06V 10/776

FOREIGN PATENT DOCUMENTS

CN 111209790 A * 5/2020 ........... G05D 1/0214

OTHER PUBLICATIONS

Agarwal et al., "Recovering 3D Human Pose from Monocular Images", IEEE Transactions on Pattern Analysis and Machine Intelligence, vol. 28, No. 1, 2006 pp. 44-58.
(Continued)

*Primary Examiner* — Xin Jia
(74) *Attorney, Agent, or Firm* — Dority & Manning, P.A.

(57) ABSTRACT

Systems and methods for generating simulation data based on real-world dynamic objects are provided. A method includes obtaining two- and three-dimensional data descriptive of a dynamic object in the real world. The two- and three-dimensional information can be provided as an input to a machine-learned model to receive object model parameters descriptive of a pose and shape modification with respect to a three-dimensional template object model. The parameters can represent a three-dimensional dynamic object model indicative of an object pose and an object shape for the dynamic object. The method can be repeated on sequential two- and three-dimensional information to generate a sequence of object model parameters over time. Portions of a sequence of parameters can be stored as simulation data descriptive of a simulated trajectory of a unique dynamic object. The parameters can be evaluated by an objective function to refine the parameters and train the machine-learned model.

18 Claims, 12 Drawing Sheets

(51) Int. Cl.
   G06T 7/70      (2017.01)
   G06T 17/20     (2006.01)
   G06V 40/20     (2022.01)
(58) Field of Classification Search
   CPC . G06T 2207/20084; G06T 2207/30241; G06T
                  7/73; G06T 2207/20081; G06T
            2207/30196; G06T 2207/30252; G06T
              7/246; G06N 20/00; G06N 3/02; G06V
              40/23; G06V 10/774; G06V 10/82; G06V
                                20/58; G06V 20/653
   See application file for complete search history.

(56)                References Cited

OTHER PUBLICATIONS

Arnab et al., "Exploiting Temporal Context for 3D Human Pose Estimation in the Wild", IEEE/CVF Conference on Computer Vision and Pattern Recognition, Jun. 15-20, 2019, Long Beach, California, pp. 3395-3404.
Alldieck et al., "Tex2Shape: Detailed Full Human Body Geometry from a Single Image", IEEE/CVF International Conference on Computer Vision Workshop, Oct. 27-28, 2019, Seoul, Korea, pp. 2296-2303.
Alldieck et al., "Video Based Reconstruction of 3D People Models", IEEE Conference on Computer Vision and Pattern Recognition, Jun. 18-23, 2018, Salt Lake City, Utah, pp. 8387-8397.
Balan et al., "Detailed Human Shape and Pose from Images", IEEE Conference on Computer Vision and Pattern Recognition, Jun. 17-22, 2007, Minneapolis, Minnesota, pp. 1-8.
Bogo et al., "Detailed Full-Body Reconstructions of Moving People from Monocular RGB-D Sequences", IEEE International Conference on Computer Vision, Dec. 7-13, 2015, Santiago, Chile, pp. 2300-2308.
Bogo et al., "FAUST: Dataset and Evaluation for 3D Mesh Registration", IEEE Conference on Computer Vision and Pattern Recognition, Jun. 23-28, 2014, Columbus, Ohio, pp. 3794-3801.
Bogo et al., "Keep it SMPL: Automatic Estimation of 3D Human Pose and Shape from a Single Image", European Conference on Computer Vision, Oct. 8-16, 2016, Amsterdam, Netherlands, pp. 561-578.
CMU Graphics Lab Motion Capture Database, "Carnegie Mellon University Motion Capture Database", http://mocap.cs.cmu.edu/, retrieved on Mar. 1, 2022, 2 pages.
Dosovitskiy et al., "CARLA: An Open Urban Driving Simulator", Conference on Robot Learning, Nov. 13-15, 2017, Mountain View, California, pp. 1-16.
Echeverria et al., "Modular Open Robots Simulation Engine: MORSE", IEEE International Conference on Robotics and Automation, May 9-13, 2011, Shanghai, China, pp. 46-51.
Insafutdinov et al., "Unsupervised Learning of Shape and Pose with Differentiable Point Clouds", Conference on Neural Information Processing Systems, Dec. 2-8, 2018, Montreal, Canada, pp. 1-16.
Ionescu et al., "Human3.6M: Large Scale Datasets and Predictive Methods for 3D Human Sensing in Natural Environments", Transactions on Pattern Analysis and Machine Intelligence, vol. 36, No. 10, 2014, pp. 1325-1339.
Joo et al., "Total Capture: A 3D Deformation Model for Tracking Faces, Hands, and Bodies", IEEE Conference on Computer Vision and Pattern Recognition, Jun. 18-23, 2018, Salt Lake City, Utah, pp. 8320-8329.
Joshi et al., "Harmonic Coordinates for Character Articulation", ACM Translations on Graphics, vol. 26, No. 3, 2007, pp. 71-81.
Kanazawa et al., "End-to-End Recovery of Human Shape and Pose", IEEE Conference on Computer Vision and Pattern Recognition, Jun. 18-23, 2018, Salt Lake City, Utah, pp. 7122-7131.
Kanazawa et al., "Learning 3D Human Dynamics from Video", IEEE/CVF Conference on Computer Vision and Pattern Recognition, Jun. 15-20, 2019, Long Beach, California, pp. 5614-5623.
Kavan et al., "Spherical Blend Skinning: A Real-Time Deformation of Articulated Models", Symposium on Interactive 3D Graphics and Games, Apr. 3-6, 2005, Washington, District of Columbia, pp. 9-16.
Kingma et al., "Adam: Method for Stochastic Optimization", arXiv:1412.6980v1, Dec. 22, 2014, 15 pages.
Kocabas et al., "VIBE: Video Inference for Human Body Pose and Shape Estimation", IEEE/CVF Conference on Computer Vision and Pattern Recognition, Jun. 13-19, 2020, Seattle, Washington, pp. 5253-5263.
Kolotouros et al., "Learning to Reconstruct 3D Human Pose and Shape Via Model-Fitting in the Loop", IEEE/CVF International Conference on Computer Vision Workshop, Oct. 27-28, 2019, pp. 2252-2261.
Lemaignan et al., "Simulation and HRI Recent Perspectives with the MORSE Simulator", $4^{th}$ International Conference on Simulation, Modeling, and Programming for Autonomous Robots, Oct. 20-23, 2014, Bergamo, Italy, pp. 13-24.
Li et al., "LBS Autoencoder: Self-Supervised Fitting of Articulated Meshes to Point Clouds", IEEE/CVF Conference on Computer Vision and Pattern Recognition, Jun. 15-20, 2019, Long Beach, California, pp. 11967-11976.
Liang et al., "PnPNet: End-to-End Perception and Prediction with Tracking in the Loop", IEEE/CVF Conference on Computer Vision and Pattern Recognition, Jun. 13-19, 2020, Seattle, Washington, pp. 11553-11562.
Loper et al., "SMPL: A Skinned Multi-Person Linear Model", ACM Transactions on Graphics, vol. 34, No. 6, pp. 1-16.
Manivasagam et al., "LiDARsim: Realistic LIDAR Simulation by Leveraging the Real World", IEEE/CVF Conference on Computer Vision and Pattern Recognition, Jun. 13-19, 2020, Seattle, Washington, pp. 11167-11176.
Von Marcard et al., "Recovering Accurate 3D Human Pose in The Wild Using IMUs and a Moving Camera", European Conference on Computer Vision, Sep. 8-14, 2018, Munich, Germany, pp. 601-617.
Martinez et al., "A Simple Yet Effective Baseline for 3D Human Pose Estimation", IEEE International Conference on Computer Vision, Oct. 22-29, 2017, Venice, Italy, pp. 2640-2649.
Möller et al., "Fast, Minimum Storage Ray-Triangle Intersection", Journal of Graphics Tools, vol. 2, No. 1, 1997, pp. 21-28.
Newcombe et al., "DynamicFusion: Reconstruction and Tracking of Non-Rigid Scenes in Real-Time", IEEE Conference on Computer Vision and Pattern Recognition, Jun. 7-12, 2015, Boston, Massachusetts, pp. 343-352.
Pavlakos et al., "Ordinal Depth Supervision for 3D Human Pose Estimation", IEEE Conference on Computer Vision and Pattern Recognition, Jun. 18-23, 2018, Salt Lake City, Utah, pp. 7307-7316.
Pavllo et al., "3D Human Pose Estimation in Video with Temporal Convolutions and Semi-Supervised Training", IEEE/CVF Conference on Computer Vision and Pattern Recognition, Jun. 15-20, 2019, Long Beach, California, pp. 7753-7762.
Saini et al., "Markerless Outdoor Human Motion Capture Using Multiple Autonomous Micro Aerial Vehicles", IEEE/CVF International Conference on Computer Vision Workshop, Oct. 27-28, 2019, Seoul, Korea, pp. 823-832.
Saito et al., "PIFu: Pixel-Aligned Implicit Function for High-Resolution Clothed Human Digitization", IEEE/CVF International Conference on Computer Vision Workshop, Oct. 27-28, 2019, Seoul, Korea, pp. 2304-2314.
Shoemake, "Animating Rotation with Quaternion Curves", Conference on Computer Graphics and Interactive Techniques, Jul. 22-26, 1985, New York, New York, pp. 245-254.
Sigal et al., "Loose-Limbed People: Estimating 3D Human Pose and Motion Using Non-Parametric Belief Propagation", International Journal of Computer Vision, vol. 98, 2012, pp. 15-48.
Sigal et al., "HUMANEVA: Synchronized Video and Motion Capture Dataset and Baseline Algorithm for Evaluation of Articulated Human Motion", International Journal of Computer Vision, vol. 87, No. 4, 2010, pp. 1-24.
Sorkine et al., "Laplacian Surface Editing", Eurographics/ACM SIGGRAPH Symposium on Geometry Processing, Jul. 8-10, 2004, New York, New York, pp. 175-184.

(56) References Cited

OTHER PUBLICATIONS

Tekin et al., "Direct Prediction of 3D Body Poses from Motion Compensated Sequences", IEEE Conference on Computer Vision and Pattern Recognition, Jun. 27-30, 2016, Las Vegas, Nevada, pp. 991-1000.
Trumble et al., "Total Capture: 3D Human Pose Estimation Fusing Video and Inertial Sensors", $28^{th}$ British Machine Vision Conference, Sep. 4-7, 2017, London, United Kingdom, pp. 1-13.
Github, "Detectron2", https://github.com/facebookresearch/detectron2 , retrieved on Mar. 1, 2022, 4 pages.
Yang et al., "PIXOR: Real-Time 3D Object Detection from Point Clouds", IEEE Conference on Computer Vision and Pattern Recognition, Jun. 18-23, 2018, Salt Lake City, Utah, pp. 7652-7660.
Yuan et al., "PCN: Point Completion Network", International Conference on 3D Vision, Sep. 5-8, 2018, Verona, Italy, pp. 728-737.
Zimmermann et al., "3D Human Pose Estimation in RGBD Images for Robotic Task Learning", IEEE International Conference on Robotics and Automation, May 21-26, 2018, Brisbane, Australia, pp. 1986-1992.
Zheng et al., "DeepHuman: 3D Human Reconstruction from a Single Image", IEEE/CVF International Conference on Computer Vision Workshop, Oct. 27-28, 2019, Seoul, Korea, pp. 2304-2314.

\* cited by examiner

SYSTEMS AND METHODS FOR SIMULATING DYNAMIC OBJECTS BASED ON REAL WORLD DATA

RELATED APPLICATION

The present application is based on and claims the benefit of U.S. Provisional Patent Application No. 63/058,052 having a filing date of Jul. 29, 2020, which is incorporated by reference herein.

BACKGROUND

The present disclosure relates generally to vehicle perception and testing. In particular, the present disclosure relates to machine-learned model training techniques that can be used with, for example, autonomous vehicles. Robots, including autonomous vehicles, can receive data that is used to perceive an environment through which the robot can travel. Robots can rely on machine-learned models to detect objects within an environment. The effective operation of a robot can depend on accurate object detection provided by the machine-learned models. Various machine-learned training techniques can be applied to improve such object detection.

SUMMARY

Aspects and advantages of embodiments of the present disclosure will be set forth in part in the following description, or may be learned from the description, or may be learned through practice of the embodiments.

In an aspect, the present disclosure provides a computing system including one or more processors and one or more computer-readable mediums. The computer-readable mediums store instructions that when executed by the one or more processors cause the computing system to perform operations. The operations include obtaining sensor data indicative of a dynamic object. The sensor data includes three-dimensional data and two-dimensional data associated with the dynamic object. The operations include providing input data descriptive of the sensor data indicative of the dynamic object as an input to a machine-learned object parameter estimation model. The operations include receiving as an output of the machine-learned object parameter estimation model, in response to receipt of the input data, a plurality of object model parameters indicative of at least one of a pose or a shape modification with respect to a template object model. The plurality of object model parameters represent a three-dimensional dynamic object model indicative of an object pose and an object shape for the dynamic object. The operations include generating at least a portion of simulation data based, at least in part, on the plurality of object model parameters.

In some implementations, the operations include generating a three-dimensional mesh representation of the dynamic object based, at least in part, on the plurality of object model parameters. The operations can include determining an initial simulated three-dimensional point cloud for the dynamic object based, at least in part, on the three-dimensional mesh representation. And, the operations can include generating a plurality of enhanced object model parameters based, at least in part, on the initial simulated three-dimensional point cloud, the three-dimensional data, and an objective function.

In some implementations, the operations further can include generating a three-dimensional set of interconnected joints representative of the dynamic object based, at least in part, on the plurality of object model parameters. The operations can include determining a two-dimensional set of interconnected joints for the dynamic object based, at least in part, on the three-dimensional set of interconnected joints. The operations can include generating the plurality of enhanced object model parameters based, at least in part, on the two-dimensional set of interconnected joints, the two-dimensional data, and the objective function.

In some implementations, generating the plurality of enhanced object model parameters based, at least in part, on the objective function can include applying the objective function to the initial simulated three-dimensional point cloud and the three-dimensional data to determine a three-dimensional consistency measure for the plurality of object model parameters. The three-dimensional consistency measure can be indicative of a consistency between the three-dimensional mesh representation of the dynamic object and the three-dimensional data. In addition, or alternatively, generating the plurality of enhanced object model parameters based, at least in part, on the objective function can include applying the objective function to the two-dimensional set of interconnected joints and the two-dimensional data to determine a joint consistency measure for the plurality of object model parameters. The joint consistency measure can be indicative of a consistency between the three-dimensional set of interconnected joints representative of the dynamic object and the two-dimensional data. The operations can include modifying the plurality of object model parameters based, at least in part, on the three-dimensional consistency measure and/or the joint consistency measure to generate the plurality of enhanced object model parameters. The plurality of object model parameters can be modified to increase (i) the consistency between the three-dimensional mesh representation of the dynamic object and the three-dimensional data and (ii) the consistency between the three-dimensional set of interconnected joints representative of the dynamic object and the two-dimensional data. In some implementations, the machine-learned object parameter estimation model can be trained based, at least in part, on the three-dimensional consistency measure and the joint consistency measure.

In some implementations, the two-dimensional data can correspond to a first time, the three-dimensional data can correspond to the first time, and/or the plurality of object model parameters can correspond to the first time. The operations can include obtaining sequential sensor data indicative of the dynamic object at one or more second times and determining a sequence of object model parameters descriptive of a respective object pose for the dynamic object at the one or more second times. The sequence of object model parameters can be indicative of a trajectory of the dynamic object. The trajectory can be indicative of at least one or more velocities of the dynamic object. In some implementations, the two dimensional data can include an image frame corresponding to the first time and/or the three dimensional data can include a three dimensional point cloud corresponding to the first time.

In some implementations, the simulation data can include a plurality of object-specific single action sequences descriptive of a plurality of dynamic objects. Generating at least the portion of the simulation data based, at least in part, on the plurality of object model parameters can include determining one or more object actions corresponding to the sequence of object model parameters based, at least in part, on the one or more velocities of the dynamic object. In some implementations, the generating at least the portion of the simulation data based, at least in part, on the plurality of object model parameters can further include generating one or more single action sequences from the sequence of object model parameters based, at least in part, on the sequence of object model parameters and the one or more object actions corresponding to the sequence of object model parameters. The operations can include storing the one or more single action sequences in a dynamic object database including the plurality of object-specific single action sequences descriptive of the plurality of dynamic objects.

In some implementations, the simulation data can further include a simulated object scene indicative of one or more movements of a respective dynamic object within a simulated environment. Generating at least the portion of the simulation data based, at least in part, on the plurality of object model parameters can include obtaining simulation scene data indicative of the simulated environment. The operations can include obtaining at least one of the plurality of object-specific single action sequences from the dynamic object database. The at least one object-specific single action sequence can be indicative of the one or more movements of the respective dynamic object. The operations can include generating the simulated object scene based, at least in part, on the simulation scene data and the at least one object-specific single action sequence.

The template object model can include a linear blend skinning model including a template mesh representation and a template hierarchical set of interconnected bones. The plurality of model parameters can include at least one of (i) a plurality of joint angles corresponding to the template hierarchical set of interconnected bones, (ii) a plurality of offsets corresponding to the template hierarchical set of interconnected bones, (iii) a plurality of scale factors corresponding to the template hierarchical set of interconnected bones, or (iv) a plurality of deformations corresponding to the template mesh representation. In some implementations, the dynamic object can be a pedestrian.

In another aspect, the present disclosure provides a computer-implemented method. The method includes obtaining sensor data indicative of a dynamic object. The sensor data includes three-dimensional data and two-dimensional data associated with the dynamic object. The method includes providing input data descriptive of the sensor data indicative of the dynamic object as an input to a machine-learned object parameter estimation model. The method includes receiving as an output of the machine-learned object parameter estimation model, in response to receipt of the input data, a plurality of object model parameters indicative of at least one of a pose or a shape modification with respect to a template object model. The plurality of object model parameters represent a three-dimensional dynamic object model indicative of an object pose and an object shape for the dynamic object. The method includes generating at least a portion of simulation data based, at least in part, on the plurality of object model parameters.

In some implementations, the method can include generating a three-dimensional mesh representation of the dynamic object based, at least in part, on the plurality of object model parameters. The method can include determining an initial simulated three-dimensional point cloud for the dynamic object based, at least in part, on the three-dimensional mesh representation. And, the method can include generating a plurality of enhanced object model parameters based, at least in part, on the initial simulated three-dimensional point cloud, the three-dimensional data, and an objective function.

In some implementations, the method can include generating a three-dimensional set of interconnected joints representative of the dynamic object based, at least in part, on the plurality of object model parameters. The method can include determining a two-dimensional set of interconnected joints for the dynamic object based, at least in part, on the three-dimensional set of interconnected joints. And, the method can include generating the plurality of enhanced object model parameters based, at least in part, on the two-dimensional set of interconnected joints, the two-dimensional data, and the objective function.

In some implementations, generating the plurality of enhanced object model parameters based, at least in part, on the objective function can include applying the objective function to the initial simulated three-dimensional point cloud and the three-dimensional data to determine a three-dimensional consistency measure for the plurality of object model parameters. The three-dimensional consistency measure can be indicative of a consistency between the three-dimensional mesh representation of the dynamic object and the three-dimensional data. The method can include applying the objective function to the two-dimensional set of interconnected joints and the two-dimensional data to determine a joint consistency measure for the plurality of object model parameters. The joint consistency measure can be indicative of a consistency between the three-dimensional set of interconnected joints representative of the dynamic object and the two-dimensional data. The method can include modifying the plurality of object model parameters based, at least in part, on the three-dimensional consistency measure and the joint consistency measure to generate the plurality of enhanced object model parameters. The plurality of object model parameters can be modified to increase (i) the consistency between the three-dimensional mesh representation of the dynamic object and the three-dimensional data and (ii) the consistency between the three-dimensional set of interconnected joints representative of the dynamic object and the two-dimensional data.

In some implementations, modifying the plurality of object model parameters based, at least in part, on the three-dimensional consistency measure and the joint consistency measure to generate the plurality of enhanced object model parameters can include performing energy minimization over the plurality of object model parameters to generate the plurality of enhanced object model parameters As yet another example, aspects of the present disclosure provide tangible, non-transitory, computer readable media that store instructions that when executed by the one or more processors cause the one or more processors to perform operations. The operations include obtaining sensor data indicative of a dynamic object. The sensor data includes three-dimensional data and two-dimensional data associated with the dynamic object. The operations include providing input data descriptive of the sensor data indicative of the dynamic object as an input to a machine-learned object parameter estimation model. The operations include receiving as an output of the machine-learned object parameter estimation model, in response to receipt of the input data, a plurality of object model parameters indicative of at least one of a pose or a shape modification with respect to a template object model. The plurality of object model parameters represent a three-dimensional dynamic object model indicative of an object pose and an object shape for the dynamic object. The operations include generating at least a portion of simulation data based, at least in part, on the plurality of object model parameters.

In some implementations, the two-dimensional data can correspond to a first time, the three-dimensional data can correspond to the first time, and/or the plurality of object model parameters can correspond to the first time. The operations can include obtaining sequential sensor data indicative of the dynamic object at one or more second times and determining a sequence of object model parameters descriptive of a respective object pose for the dynamic object at the one or more second times. The sequence of object model parameters can be indicative of a trajectory of the dynamic object. The trajectory can be indicative of at least one or more velocities of the dynamic object.

In some implementations, the simulation data can include a plurality of object-specific single action sequences descriptive of a plurality of dynamic objects. Generating at least the portion of the simulation data based, at least in part, on the plurality of object model parameters can include determining one or more object actions corresponding to the sequence of object model parameters based, at least in part, on the one or more velocities of the dynamic object and generating one or more single action sequences from the sequence of object model parameters based, at least in part, on the sequence of object model parameters and the one or more object actions corresponding to the sequence of object model parameters. The operations can include storing the one or more single action sequences in a dynamic object database including the plurality of object-specific single action sequences descriptive of the plurality of dynamic objects.

Other example aspects of the present disclosure are directed to other systems, methods, vehicles, apparatuses, tangible non-transitory computer-readable media, and devices for generating data (e.g., scene representations, simulation data, etc.), training models, and performing other functions described herein. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
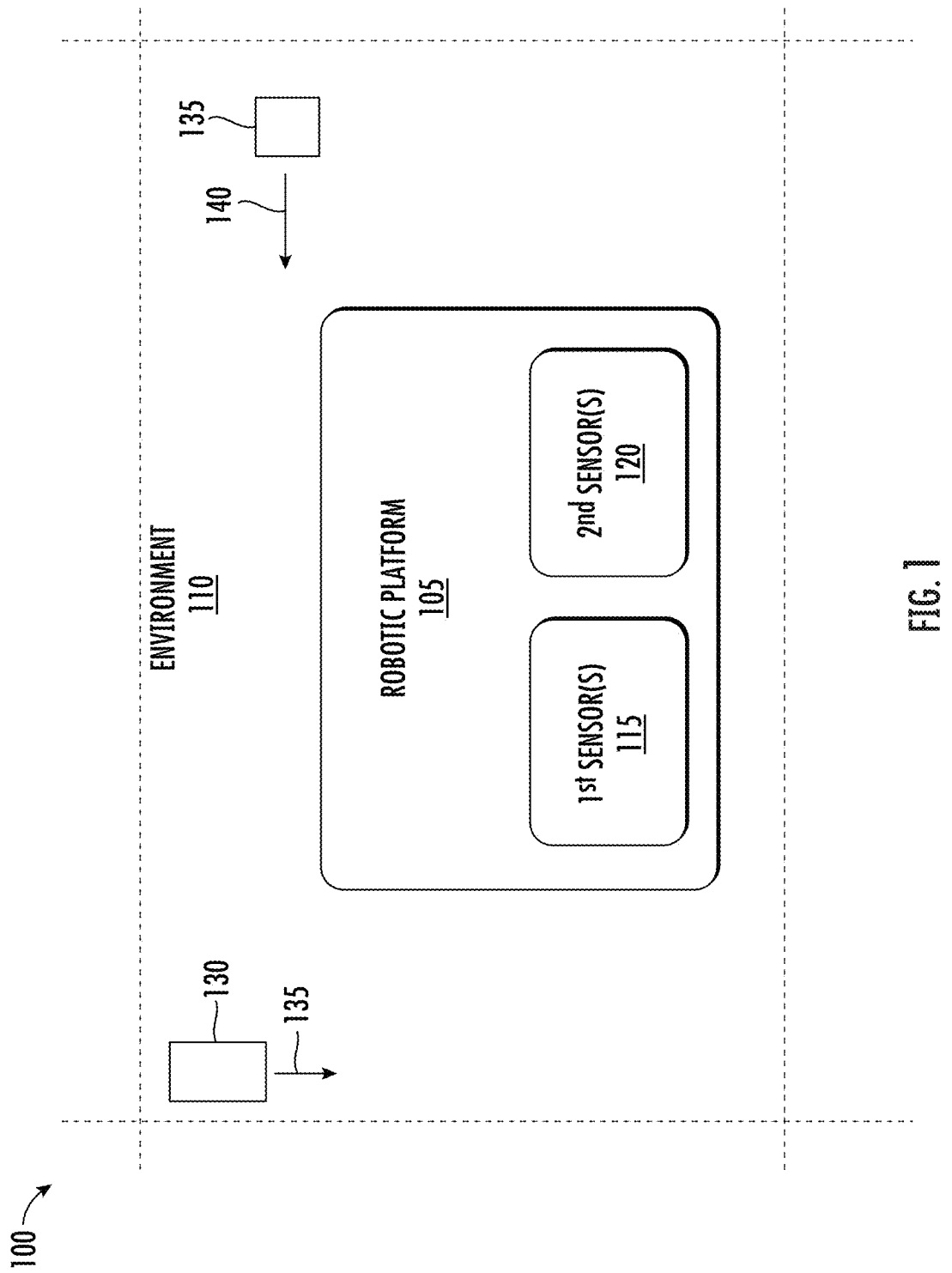
FIG. 1 is a block diagram of an operational scenario, according to some implementations of the present disclosure.

Aspects of the present disclosure are directed to improved systems and methods for generating simulation data to test robotic platforms by generating a bank of simulated dynamic object sequences from real-world data and placing at least one of the object sequences within a simulated environment. A robotic platform (or one or more sensors thereof) can obtain sensor data indicative of dynamic object (s) within an environment. The robotic platform can include, for example, an autonomous vehicle, and the dynamic objects can include pedestrians or other non-rigid objects with diverse shapes and poses. The sensor data can include two-dimensional data (e.g., image frames captured through camera(s)) supplemented by corresponding three-dimensional data (e.g., light detection and ranging ("LiDAR") data captured through LIDAR system(s)). The robotic platform leverages one or more machine-learning models to identify dynamic objects within its environment based on the sensor data. These machine-learned model(s) can be trained to identify and forecast movements of pedestrians and other dynamic object(s) within an environment using training data. The training data can include labeled real-world or simulated sensor data descriptive of one or more potential real-world scenarios. The systems and methods described herein provide an improvement to machine-learning techniques for generating simulated environments with one or more dynamic objects based on real world data. In particular, the present disclosure describes a machine-learned object parameter estimation model capable of generating dynamic object sequences from real-world data without ground truths. By using real-world data, the systems and methods described herein can generate realistic dynamic object simulations at scale. The resulting simulations can provide an improvement to testing techniques for autonomous vehicles, machine-learning algorithms, vision systems, etc. by providing a bank of realistic, unique object sequences for rendering within a simulated environment, thereby increasing the scenario diversity during training.

More particularly, the systems and methods of the present disclosure enable the generation of three-dimensional simulation data including realistic pedestrian simulation sequences for training perception algorithms at scale. This is done by enhancing a three-dimensional scene with one or more pedestrian simulation sequences (e.g., a simulated pedestrian moving along a trajectory) from a bank of realistic three-dimensional pedestrian sequences. The bank of realistic three-dimensional pedestrian sequences can be automatically generated based on real-world data using a self-supervised machine-learned model (e.g., the machine-learned object parameter estimation model, etc.). Each realistic three-dimensional pedestrian sequence can be generated based on three-dimensional data (e.g., sparse point cloud(s), etc.)) and two-dimensional data (e.g., image frame(s), etc.) captured by one or more sensor(s) of a robotic platform. The two- and three-dimensional data can be input to a regression network to obtain model parameters defining the shape and pose of a pedestrian with respect to a template three-dimensional model. The model parameters can be evaluated by an objective function that measures the consistency between: (1) the shape (e.g., a mesh generated according to the model parameters) of the pedestrian and the input three-dimensional data; (2) the pose (e.g., estimated joints generated according to the model parameters) of the pedestrian and the input two-dimensional data; and (3) the shape/pose of the pedestrian and a plurality of previous observations. The regression network can be trained in a self-supervised manner to minimize the objective function. Multiple sets of model parameters can be obtained for a pedestrian over time to automatically generate a pedestrian simulation sequence descriptive of a trajectory (e.g., speed, direction, etc.) and shape of a respective pedestrian over time. A machine-learned model can be trained by generating a simulated environment including one or more pedestrian sequences, inputting the simulated environment to the machine-learned model, and modifying one or more parameter(s) of the machine-learned model based, at least in part, on the output of the model (e.g., correct or incorrect pedestrian detections/forecasted movements).

Aspects of the present disclosure can provide a number of technical improvements to simulation, robotics, and computer vision technology. The machine-learned object parameter estimation model can leverage one template model and sensor information captured by a robotic platform to generate realistic pedestrian sequences that capture the diverse shapes, poses, or movements of a number of dynamic objects operating in the real-world. In this way, the systems and methods of the present disclosure provide an improved approach for generating simulation data by creating a scalable dataset of dynamic object sequences. This, in turn, can increase the performance of machine learning models by providing diverse training data descriptive of a plurality real-world scenarios.

The systems and methods described herein can accumulate and utilize newly available information such as object model parameters, template object models, object-specific single action sequences, etc. to provide practical improvements to simulation, robotic, and vision technology. The object model parameters, for example, can recover the unique shape and pose of dynamic objects encountered by a robotic platform. The machine-learned models described herein can learn to generate the object model parameters from two and three dimensional data by exploiting a modifiable template object model. As a result, a computing system can generate object model parameters descriptive of the unique shape and pose of a plurality of different dynamic objects. A sequence of object models can be obtained over time and analyzed to generate a plurality of object-specific single action sequences. Each single action sequence can be descriptive of one or more movement(s) of a unique dynamic object. A single action sequence can be used to modify one or more respective movements of a unique dynamic object within a simulated environment. This, in turn, improves the functioning of simulation, robotics, and computer vision technologies by increasing the diversity and scalability of simulated environments. Ultimately, the techniques disclosed herein result in more accurate, robust, and diverse simulation data; thereby improving training techniques for a vast array of robotic, vision, or autonomous vehicle technologies.

The following describes the technology of this disclosure within the context of an autonomous vehicle for example purposes only. As described herein, the technology described herein is not limited to an autonomous vehicle and can be implemented within other robotic and computing systems.

With reference now to FIGS. 1-11, example embodiments of the present disclosure will be discussed in further detail. FIG. 1 is a block diagram of an operational scenario 100, according to some implementations of the present disclosure. The operational scenario 100 includes a robotic platform 105 and an environment 110. The environment 110 can be external to the robotic platform 105. The robotic platform 105, for example, can operate within the environment 110. The environment 110 can include an indoor environment (e.g., within one or more facilities) or an outdoor environment. An outdoor environment, for example, can include one or more areas in the outside world such as, for example, one or more rural areas (e.g., with one or more rural travel ways, etc.), one or more urban areas (e.g., with one or more city travel ways, etc.), one or more suburban areas (e.g., with one or more suburban travel ways, etc.), etc. An indoor environment, for example, can include environments enclosed by a structure such as a building (e.g., a service depot, manufacturing facility, etc.).

The environment 110 can include one or more dynamic object(s) 130. The dynamic object(s) 130 can include any number of moveable objects such as, for example, one or more pedestrians, animals, vehicles, etc. The object(s) 130 can move within the environment according to one or more trajectories 135. Each object 130 can exhibit a unique shape, size, pose, or movement characteristics (e.g., speed, direction of travel, etc.). For instance, the object(s) 130 can include one or more non-rigid objects such as pedestrian(s) exhibiting a wide variety of shapes, poses, and behaviors (e.g., trajectories, decision-making, etc.)

The robotic platform 105 can include one or more sensor(s) 115, 120. The one or more sensors 115, 120 can be configured to generate or store data descriptive of the environment 110 (e.g., one or more static or dynamic object(s) 130 therein). The sensor(s) 115, 120 can include one or more Light Detection and Ranging (LiDAR) systems, one or more Radio Detection and Ranging (RADAR) systems, one or more cameras (e.g., visible spectrum cameras or infrared cameras), one or more sonar systems, one or more motion sensors, or other types of image capture devices or sensors. The sensor(s) 115, 120 can include multiple sensors of different types. For instance, the sensor(s) 115, 120 can include one or more first sensor(s) 115 and one or more second sensor(s) 120. The first sensor(s) 115 can include a different type of sensor than the second sensor(s) 120. By way of example, the first sensor(s) 115 can include one or more imaging device(s) (e.g., cameras, etc.), whereas the second sensor(s) 120 can include one or more depth measuring device(s) (e.g., LiDAR device, etc.).

The robotic platform 105 can include any type of platform configured to operate with the environment 110. For example, the robotic platform 105 can include one or more different type(s) of vehicle(s) configured to perceive and operate within the environment 110. The vehicles, for example, can include one or more autonomous vehicle(s) such as, for example, one or more autonomous trucks. By way of example, the robotic platform 105 can include an autonomous truck including an autonomous tractor coupled to a cargo trailer. In addition, or alternatively, the robotic platform 105 can include any other type of vehicle such as one or more aerial vehicles, ground-based vehicles, water-based vehicles, space-based vehicles, etc.

Figure 2:
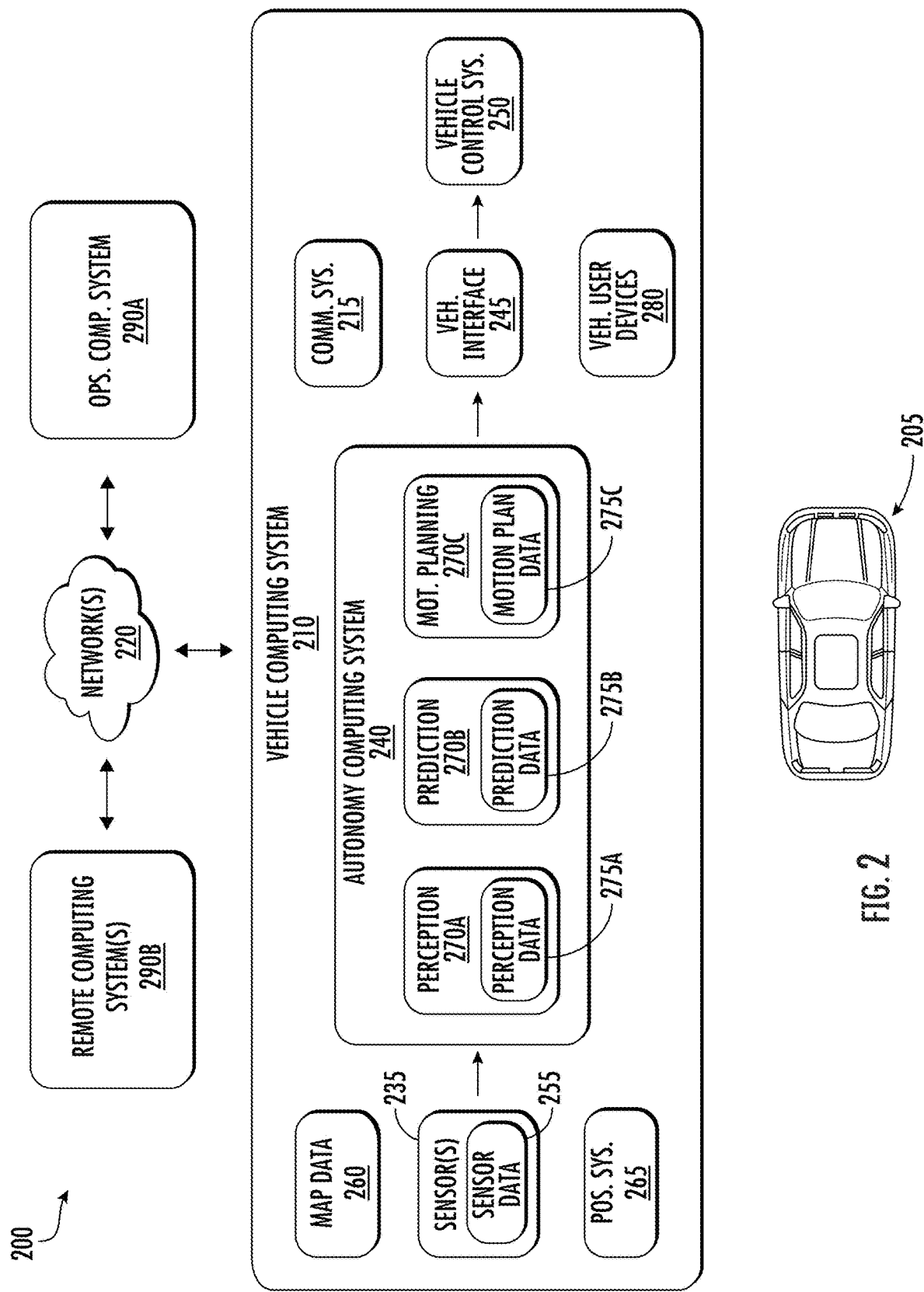
FIG. 2 is a block diagram of a system, according to some implementations of the present disclosure.

FIG. 2 is a block diagram of a system 200, according to some implementations of the present disclosure. More particularly, FIG. 2 illustrates a vehicle 205 including various systems and devices configured to control the operation of the vehicle 205. For example, the vehicle 205 can include an onboard vehicle computing system 210 (e.g., located on or within the autonomous vehicle, etc.) that is configured to operate the vehicle 210. Generally, the vehicle computing system 210 can obtain sensor data 255 from a sensor system 235 (e.g., sensor(s) 115, 120 of FIG. 1) onboard the vehicle 205, attempt to comprehend the vehicle's surrounding environment by performing various processing techniques on the sensor data 255, and generate an appropriate motion plan through the vehicle's surrounding environment (e.g., environment 110 of FIG. 1).

The vehicle 205 incorporating the vehicle computing system 200 can be various types of vehicles. For instance, the vehicle 205 can be an autonomous vehicle. The vehicle 205 can be a ground-based autonomous vehicle (e.g., car, truck, bus, etc.). The vehicle 205 can be an air-based autonomous vehicle (e.g., airplane, helicopter, vertical take-off and lift (VTOL) aircraft, etc.). The vehicle 205 can be a lightweight elective vehicle (e.g., bicycle, scooter, etc.). The vehicle 205 can be another type of vehicle (e.g., watercraft, etc.). The vehicle 205 can drive, navigate, operate, etc. with minimal or no interaction from a human operator (e.g., driver, pilot, etc.). In some implementations, a human operator can be omitted from the vehicle 205 (or also omitted from remote control of the vehicle 205). In some implementations, a human operator can be included in the vehicle 205.

The vehicle 205 can be configured to operate in a plurality of operating modes. The vehicle 205 can be configured to operate in a fully autonomous (e.g., self-driving) operating mode in which the vehicle 205 is controllable without user input (e.g., can drive and navigate with no input from a human operator present in the vehicle 205 or remote from the vehicle 205). The vehicle 205 can operate in a semi-autonomous operating mode in which the vehicle 205 can operate with some input from a human operator present in the vehicle 205 (or a human operator that is remote from the vehicle 205). The vehicle 205 can enter into a manual operating mode in which the vehicle 205 is fully controllable by a human operator (e.g., human driver, pilot, etc.) and can be prohibited or disabled (e.g., temporary, permanently, etc.) from performing autonomous navigation (e.g., autonomous driving, flying, etc.). The vehicle 205 can be configured to operate in other modes such as, for example, park or sleep modes (e.g., for use between tasks/actions such as waiting to provide a vehicle service, recharging, etc.). In some implementations, the vehicle 205 can implement vehicle operating assistance technology (e.g., collision mitigation system, power assist steering, etc.), for example, to help assist the human operator of the vehicle 205 (e.g., while in a manual mode, etc.).

To help maintain and switch between operating modes, the vehicle computing system 210 can store data indicative of the operating modes of the vehicle 205 in a memory onboard the vehicle 205. For example, the operating modes can be defined by an operating mode data structure (e.g., rule, list, table, etc.) that indicates one or more operating parameters for the vehicle 205, while in the particular operating mode. For example, an operating mode data structure can indicate that the vehicle 205 is to autonomously plan its motion when in the fully autonomous operating mode. The vehicle computing system 210 can access the memory when implementing an operating mode.

The operating mode of the vehicle 205 can be adjusted in a variety of manners. For example, the operating mode of the vehicle 205 can be selected remotely, off-board the vehicle 205. For example, a remote computing system (e.g., of a vehicle provider or service entity associated with the vehicle 205) can communicate data to the vehicle 205 instructing the vehicle 205 to enter into, exit from, maintain, etc. an operating mode. By way of example, such data can instruct the vehicle 205 to enter into the fully autonomous operating mode.

In some implementations, the operating mode of the vehicle 205 can be set onboard or near the vehicle 205. For example, the vehicle computing system 210 can automatically determine when and where the vehicle 205 is to enter, change, maintain, etc. a particular operating mode (e.g., without user input). Additionally, or alternatively, the operating mode of the vehicle 205 can be manually selected through one or more interfaces located onboard the vehicle 205 (e.g., key switch, button, etc.) or associated with a computing device within a certain distance to the vehicle 205 (e.g., a tablet operated by authorized personnel located near the vehicle 205 and connected by wire or within a wireless communication range). In some implementations, the operating mode of the vehicle 205 can be adjusted by manipulating a series of interfaces in a particular order to cause the vehicle 205 to enter into a particular operating mode.

The operations computing system 290A can include multiple components for performing various operations and functions. For example, the operations computing system 290A can be configured to monitor and communicate with the vehicle 205 or its users to coordinate a vehicle service provided by the vehicle 205. To do so, the operations computing system 290A can communicate with the one or more remote computing system(s) 290B or the vehicle 205 through one or more communications network(s) including the communications network(s) 220. The communications network(s) 220 can send or receive signals (e.g., electronic signals) or data (e.g., data from a computing device) and include any combination of various wired (e.g., twisted pair cable) or wireless communication mechanisms (e.g., cellular, wireless, satellite, microwave, and radio frequency) or any desired network topology (or topologies). For example, the communications network 220 can include a local area network (e.g., intranet), wide area network (e.g., the Internet), wireless LAN network (e.g., through Wi-Fi), cellular network, a SATCOM network, VHF network, a HF network, a WiMAX based network, or any other suitable communications network (or combination thereof) for transmitting data to or from the vehicle 205.

Each of the one or more remote computing system(s) 290B or the operations computing system 290A can include one or more processors and one or more memory devices. The one or more memory devices can be used to store instructions that when executed by the one or more processors of the one or more remote computing system(s) 290B or operations computing system 290A cause the one or more processors to perform operations or functions including operations or functions associated with the vehicle 205 including sending or receiving data or signals to or from the vehicle 205, monitoring the state of the vehicle 205, or controlling the vehicle 205. The one or more remote computing system(s) 290B can communicate (e.g., exchange data or signals) with one or more devices including the operations computing system 290A and the vehicle 205 through the communications network 220.

The one or more remote computing system(s) 290B can include one or more computing devices such as, for example, one or more operator devices associated with one or more vehicle providers (e.g., providing vehicles for use by the service entity), user devices associated with one or more vehicle passengers, developer devices associated with one or more vehicle developers (e.g., a laptop/tablet computer configured to access computer software of the vehicle computing system 210), etc. One or more of the devices can receive input instructions from a user or exchange signals or data with an item or other computing device or computing system (e.g., the operations computing system 290A). Further, the one or more remote computing system(s) 290B can be used to determine or modify one or more states of the vehicle 205 including a location (e.g., a latitude and longitude), a velocity, an acceleration, a trajectory, a heading, or a path of the vehicle 205 based in part on signals or data exchanged with the vehicle 205. In some implementations, the operations computing system 290A can include the one or more remote computing system(s) 290B.

The vehicle computing system 210 can include one or more computing devices located onboard the autonomous vehicle 205. For example, the computing device(s) can be located on or within the autonomous vehicle 205. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 205 (e.g., its computing system, one or more processors, etc.) to perform operations and functions, such as those described herein for collecting training data (e.g., sensor data, image data, LiDAR data, etc. indicative of one or more environments, dynamic objects, etc.), communicating with other computing systems, etc.

The vehicle 205 can include a communications system 215 configured to allow the vehicle computing system 210 (and its computing device(s)) to communicate with other computing devices. The communications system 215 can include any suitable components for interfacing with one or more network(s) 220, including, for example, transmitters, receivers, ports, controllers, antennas, or other suitable components that can help facilitate communication. In some implementations, the communications system 215 can include a plurality of components (e.g., antennas, transmitters, or receivers) that allow it to implement and utilize multiple-input, multiple-output (MIMO) technology and communication techniques.

The vehicle computing system 210 can use the communications system 215 to communicate with one or more computing device(s) that are remote from the vehicle 205 over one or more networks 220 (e.g., through one or more wireless signal connections). The network(s) 220 can exchange (send or receive) signals (e.g., electronic signals), data (e.g., data from a computing device), or other information and include any combination of various wired (e.g., twisted pair cable) or wireless communication mechanisms (e.g., cellular, wireless, satellite, microwave, and radio frequency) or any desired network topology (or topologies). For example, the network(s) 220 can include a local area network (e.g., intranet), wide area network (e.g., Internet), wireless LAN network (e.g., through Wi-Fi), cellular network, a SATCOM network, VHF network, a HF network, a WiMAX based network, or any other suitable communication network (or combination thereof) for transmitting data to or from the vehicle 205 or among computing systems.

As shown in FIG. 2, the vehicle computing system 210 can include the one or more sensors 235, the autonomy computing system 240, the vehicle interface 245, the one or more vehicle control systems 250, and other systems, as described herein. One or more of these systems can be configured to communicate with one another through one or more communication channels. The communication channel(s) can include one or more data buses (e.g., controller area network (CAN)), on-board diagnostics connector (e.g., OBD-II), or a combination of wired or wireless communication links. The onboard systems can send or receive data, messages, signals, etc. amongst one another through the communication channel(s).

In some implementations, the sensor(s) 235 can include at least two different types of sensor(s). For instance, the sensor(s) 235 can include at least one first sensor (e.g., the first sensor(s) 115, etc.) and at least one second sensor (e.g., the second sensor(s) 120, etc.). The at least one first sensor can be a different type of sensor than the at least one second sensor. For example, the at least one first sensor can include one or more image capturing device(s) (e.g., one or more cameras, RGB cameras, etc.). In addition, or alternatively, the at least one second sensor can include one or more depth capturing device(s) (e.g., LiDAR sensor, etc.). The at least two different types of sensor(s) can obtain sensor data (e.g., a portion of sensor data 255) indicative of one or more dynamic objects within an environment of the autonomous vehicle 205. As described herein with reference to the remaining figures, the sensor data 255 can be collected for use in generating simulation data including a number of dynamic objects. The resulting simulation data can provide a basis for robotic platform testing, training one or more machine-learned models of the vehicle computing system 210, etc.

More generally, the sensor(s) 235 can be configured to acquire sensor data 255. The sensor(s) 235 can be external sensors configured to acquire external sensor data. This can include sensor data associated with the surrounding environment of the vehicle 205. The surrounding environment of the vehicle 205 can include/be represented in the field of view of the sensor(s) 235. For instance, the sensor(s) 235 can acquire image or other data of the environment outside of the vehicle 205 and within a range or field of view of one or more of the sensor(s) 235. This can include different types of sensor data acquired by the sensor(s) 235 such as, for example, data from one or more Light Detection and Ranging (LIDAR) systems, one or more Radio Detection and Ranging (RADAR) systems, one or more cameras (e.g., visible spectrum cameras, infrared cameras, etc.), one or more motion sensors, one or more audio sensors (e.g., microphones, etc.), or other types of imaging capture devices or sensors. The one or more sensors can be located on various parts of the vehicle 205 including a front side, rear side, left side, right side, top, or bottom of the vehicle 205. The sensor data 255 can include image data (e.g., 2D camera data, video data, etc.), RADAR data, LIDAR data (e.g., 3D point cloud data, etc.), audio data, or other types of data. The vehicle 205 can also include other sensors configured to acquire data associated with the vehicle 205. For example, the vehicle 205 can include inertial measurement unit(s), wheel odometry devices, or other sensors.

The sensor data 255 can be indicative of one or more objects within the surrounding environment of the vehicle 205. The object(s) can include, for example, vehicles, pedestrians, bicycles, or other objects. The object(s) can be located in front of, to the rear of, to the side of, above, below the vehicle 205, etc. The sensor data 255 can be indicative of locations associated with the object(s) within the surrounding environment of the vehicle 205 at one or more times. The object(s) can be static objects (e.g., not in motion) or dynamic objects/actors (e.g., in motion or likely to be in motion) in the vehicle's environment. The sensor data 255 can also be indicative of the static background of the environment. The sensor(s) 235 can provide the sensor data 255 to the autonomy computing system 240, the remote computing device(s) 290B, or the operations computing system 290A.

In addition to the sensor data 255, the autonomy computing system 240 can obtain map data 260. The map data 260 can provide detailed information about the surrounding environment of the vehicle 205 or the geographic area in which the vehicle was, is, or will be located. For example, the map data 260 can provide information regarding: the identity and location of different roadways, road segments, buildings, or other items or objects (e.g., lampposts, crosswalks or curb); the location and directions of traffic lanes (e.g., the location and direction of a parking lane, a turning lane, a bicycle lane, or other lanes within a particular roadway or other travel way or one or more boundary markings associated therewith); traffic control data (e.g., the location and instructions of signage, traffic lights, or other traffic control devices); obstruction information (e.g., temporary or permanent blockages, etc.); event data (e.g., road closures/traffic rule alterations due to parades, concerts, sporting events, etc.); nominal vehicle path data (e.g., indicate of an ideal vehicle path such as along the center of a certain lane, etc.); or any other map data that provides information that assists the vehicle computing system 210 in processing, analyzing, and perceiving its surrounding environment and its relationship thereto. In some implementations, the map data 260 can include high definition map data. In some implementations, the map data 260 can include sparse map data indicative of a limited number of environmental features (e.g., lane boundaries, etc.). In some implementations, the map data can be limited to geographic area(s) or operating domains in which the vehicle 205 (or autonomous vehicles generally) may travel (e.g., due to legal/regulatory constraints, autonomy capabilities, or other factors).

The vehicle 205 can include a positioning system 265. The positioning system 265 can determine a current position of the vehicle 205. This can help the vehicle 205 localize itself within its environment. The positioning system 265 can be any device or circuitry for analyzing the position of the vehicle 205. For example, the positioning system 265 can determine position by using one or more of inertial sensors (e.g., inertial measurement unit(s), etc.), a satellite positioning system, based on IP address, by using triangulation or proximity to network access points or other network components (e.g., cellular towers, WiFi access points, etc.) or other suitable techniques. The position of the vehicle 205 can be used by various systems of the vehicle computing system 210 or provided to a remote computing system. For example, the map data 260 can provide the vehicle 205 relative positions of the elements of a surrounding environment of the vehicle 205. The vehicle 205 can identify its position within the surrounding environment (e.g., across six axes, etc.) based at least in part on the map data 260. For example, the vehicle computing system 210 can process the sensor data 255 (e.g., LIDAR data, camera data, etc.) to match it to a map of the surrounding environment to get an understanding of the vehicle's position within that environment. Data indicative of the vehicle's position can be stored, communicated to, or otherwise obtained by the autonomy computing system 240.

The autonomy computing system 240 can perform various functions for autonomously operating the vehicle 205. For example, the autonomy computing system 240 can perform the following functions: perception 270A, prediction 270B, and motion planning 270C. For example, the autonomy computing system 240 can obtain the sensor data 255 through the sensor(s) 235, process the sensor data 255 (or other data) to perceive its surrounding environment, predict the motion of objects within the surrounding environment, and generate an appropriate motion plan through such surrounding environment. In some implementations, these autonomy functions can be performed by one or more sub-systems such as, for example, a perception system, a prediction system, a motion planning system, or other systems that cooperate to perceive the surrounding environment of the vehicle 205 and determine a motion plan for controlling the motion of the vehicle 205 accordingly. In some implementations, one or more of the perception, prediction, or motion planning functions 270A, 270B, 270C can be performed by (or combined into) the same system or through shared computing resources. In some implementations, one or more of these functions can be performed through different sub-systems. As further described herein, the autonomy computing system 240 can communicate with the one or more vehicle control systems 250 to operate the vehicle 205 according to the motion plan (e.g., through the vehicle interface 245, etc.).

The vehicle computing system 210 (e.g., the autonomy computing system 240) can identify one or more objects that are within the surrounding environment of the vehicle 205 based at least in part on the sensor data 235 or the map data 260. The objects perceived within the surrounding environment can be those within the field of view of the sensor(s) 235 or predicted to be occluded from the sensor(s) 235. This can include object(s) not in motion or not predicted to move (static objects) or object(s) in motion or predicted to be in motion (dynamic objects/actors). The vehicle computing system 210 (e.g., performing the perception function 270C, using a perception system, etc.) can process the sensor data 255, the map data 260, etc. to obtain perception data 275A. The vehicle computing system 210 can generate perception data 275A that is indicative of one or more states (e.g., current or past state(s)) of one or more objects that are within a surrounding environment of the vehicle 205. For example, the perception data 275A for each object can describe (e.g., for a given time, time period) an estimate of the object's: current or past location (also referred to as position); current or past speed/velocity; current or past acceleration; current or past heading; current or past orientation; size/footprint (e.g., as represented by a bounding shape, object highlighting, etc.); class (e.g., pedestrian class vs. vehicle class vs. bicycle class, etc.), the uncertainties associated therewith, or other state information. The vehicle computing system 210 can utilize one or more algorithms or machine-learned model(s) that are configured to identify object(s) based at least in part on the sensor data 255. This can include, for example, one or more neural networks trained to identify object(s) within the surrounding environment of the vehicle 205 and the state data associated therewith. The perception data 275A can be utilized for the prediction function 275B of the autonomy computing system 240.

The vehicle computing system 210 can be configured to predict a motion of the object(s) within the surrounding environment of the vehicle 205. For instance, the vehicle computing system 210 can generate prediction data 275B associated with such object(s). The prediction data 275B can be indicative of one or more predicted future locations of each respective object. For example, the prediction system 275B can determine a predicted motion trajectory along which a respective object is predicted to travel over time. A predicted motion trajectory can be indicative of a path that the object is predicted to traverse and an associated timing with which the object is predicted to travel along the path. The predicted path can include or be made up of a plurality of way points. In some implementations, the prediction data 275B can be indicative of the speed or acceleration at which the respective object is predicted to travel along its associated predicted motion trajectory. The vehicle computing system 210 can utilize one or more algorithms or machine-learned model(s) that are configured to predict the future motion of object(s) based at least in part on the sensor data 255, the perception data 275A, map data 260, or other data. This can include, for example, one or more neural networks trained to predict the motion of the object(s) within the surrounding environment of the vehicle 205 based at least in part on the past or current state(s) of those objects as well as the environment in which the objects are located (e.g., the lane boundary in which it is travelling, etc.). The prediction data 275B can be utilized for the motion planning function 270C of the autonomy computing system 240.

The vehicle computing system 210 can determine a motion plan for the vehicle 205 based at least in part on the perception data 275A, the prediction data 275B, or other data. For example, the vehicle computing system 210 can generate motion planning data 275C indicative of a motion plan. The motion plan can include vehicle actions (e.g., speed(s), acceleration(s), other actions, etc.) with respect to one or more of the objects within the surrounding environment of the vehicle 205 as well as the objects' predicted movements. The motion plan can include one or more vehicle motion trajectories that indicate a path for the vehicle 205 to follow. A vehicle motion trajectory can be of a certain length or time range. A vehicle motion trajectory can be defined by one or more way points (with associated coordinates). The planned vehicle motion trajectories can indicate the path the vehicle 205 is to follow as it traverses a route from one location to another. Thus, the vehicle computing system 210 can take into account a route/route data when performing the motion planning function 270C.

The vehicle computing system 210 can implement an optimization algorithm, machine-learned model, etc. that considers cost data associated with a vehicle action as well as other objective functions (e.g., cost functions based on speed limits, traffic lights, etc.), if any, to determine optimized variables that make up the motion plan. The vehicle computing system 210 can determine that the vehicle 205 can perform a certain action (e.g., pass an object, etc.) without increasing the potential risk to the vehicle 205 or violating any traffic laws (e.g., speed limits, lane boundaries, signage, etc.). For instance, the vehicle computing system 210 can evaluate the predicted motion trajectories of one or more objects during its cost data analysis to help determine an optimized vehicle trajectory through the surrounding environment. The motion planning system 280 can generate cost data associated with such trajectories. In some implementations, one or more of the predicted motion trajectories or perceived objects may not ultimately change the motion of the vehicle 205 (e.g., due to an overriding factor). In some implementations, the motion plan may define the vehicle's motion such that the vehicle 205 avoids the object(s), reduces speed to give more leeway to one or more of the object(s), proceeds cautiously, performs a stopping action, passes an object, queues behind/in front of an object, etc.

The vehicle computing system 210 can be configured to continuously update the vehicle's motion plan and corresponding planned vehicle motion trajectories. For example, in some implementations, the vehicle computing system 210 can generate new motion planning data 275C/motion plan(s) for the vehicle 205 (e.g., multiple times per second, etc.). Each new motion plan can describe a motion of the vehicle 205 over the next planning period (e.g., next several seconds, etc.). Moreover, a new motion plan may include a new planned vehicle motion trajectory. Thus, in some implementations, the vehicle computing system 210 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 205.

The vehicle computing system 210 can cause the vehicle 205 to initiate a motion control in accordance with at least a portion of the motion planning data 275C. A motion control can be an operation, action, etc. that is associated with controlling the motion of the vehicle 205. For instance, the motion planning data 275C can be provided to the vehicle control system(s) 250 of the vehicle 205. The vehicle control system(s) 250 can be associated with a vehicle interface 245 that is configured to implement a motion plan. The vehicle interface 245 can serve as an interface/conduit between the autonomy computing system 240 and the vehicle control systems 250 of the vehicle 205 and any electrical/mechanical controllers associated therewith. The vehicle interface 245 can, for example, translate a motion plan into instructions for the appropriate vehicle control component (e.g., acceleration control, brake control, steering control, etc.). By way of example, the vehicle interface 245 can translate a determined motion plan into instructions to adjust the steering of the vehicle 205 "X" degrees, apply a certain magnitude of braking force, increase/decrease speed, etc. The vehicle interface 245 can help facilitate the responsible vehicle control (e.g., braking control system, steering control system, acceleration control system, etc.) to execute the instructions and implement a motion plan (e.g., by sending control signal(s), making the translated plan available, etc.). This can allow the vehicle 205 to autonomously travel within the vehicle's surrounding environment.

The vehicle computing system 210 can store other types of data. For example, an indication, record, or other data indicative of the state of the vehicle (e.g., its location, motion trajectory, health information, etc.), the state of one or more users (e.g., passengers, operators, etc.) of the vehicle, or the state of an environment including one or more objects (e.g., the physical dimensions or appearance of the one or more objects, locations, predicted motion, etc.) can be stored locally in one or more memory devices of the vehicle 205. Additionally, the vehicle 205 can communicate data indicative of the state of the vehicle, the state of one or more passengers of the vehicle, or the state of an environment to a computing system that is remote from the vehicle 205, which can store such information in one or more memories remote from the vehicle 205. Moreover, the vehicle 205 can provide any of the data created or store onboard the vehicle 205 to another vehicle.

The vehicle computing system 210 can include the one or more vehicle user devices 280. For example, the vehicle computing system 210 can include one or more user devices with one or more display devices located onboard the vehicle 205. A display device (e.g., screen of a tablet, laptop, or smartphone) can be viewable by a user of the vehicle 205 that is located in the front of the vehicle 205 (e.g., driver's seat, front passenger seat). Additionally, or alternatively, a display device can be viewable by a user of the vehicle 205 that is located in the rear of the vehicle 205 (e.g., a back passenger seat). The user device(s) associated with the display devices can be any type of user device such as, for example, a table, mobile phone, laptop, etc. The vehicle user device(s) 280 can be configured to function as human-machine interfaces. For example, the vehicle user device(s) 280 can be configured to obtain user input, which can then be utilized by the vehicle computing system 210 or another computing system (e.g., a remote computing system, etc.). For example, a user (e.g., a passenger for transportation service, a vehicle operator, etc.) of the vehicle 205 can provide user input to adjust a destination location of the vehicle 205. The vehicle computing system 210 or another computing system can update the destination location of the vehicle 205 and the route associated therewith to reflect the change indicated by the user input.

As described herein, with reference to the remaining figures, the autonomy computing system 240 can utilize one or more machine-learned models to perform the perception 270A, prediction 270B, or motion planning 270C functions. The machine-learned model(s) can be previously trained through one or more machine-learned techniques. The machine-learned models can be previously trained by the one or more remote computing system(s) 290B, the operations computing system 290A, or any other device (e.g., remote servers, training computing systems, etc.) remote from or onboard the vehicle 205. For example, the one or more machine-learned models can be learned by a training computing system (e.g., the operations computing system 290A, etc.) over training data stored in a training database. The training data can include sequential sensor data indicative of a plurality of environments at one or more times. The sequential sensor data can be indicative of a plurality of dynamic objects within the environments. In some implementations, the training data can include a plurality of environments previously recorded by the autonomous vehicle 205. For instance, the training data can be indicative of a plurality of dynamic objects previously observed or identified by the autonomous vehicle 205.

To help improve the performance of a robotic platform, such as an autonomous vehicle of FIG. 2, the technology of present disclosure can leverage sensor data 255 indicative of one or more dynamic objects to generate sequences of object model parameters descriptive of realistic shapes, sizes, poses, and movements of a plurality of previously observed objects. Using the technology of the present disclosure, the sequences of object model parameters can be used to render dynamic objects within a simulated environment to create simulations descriptive of a plurality of movements of the dynamic objects within the simulated environment.

Figure 3:
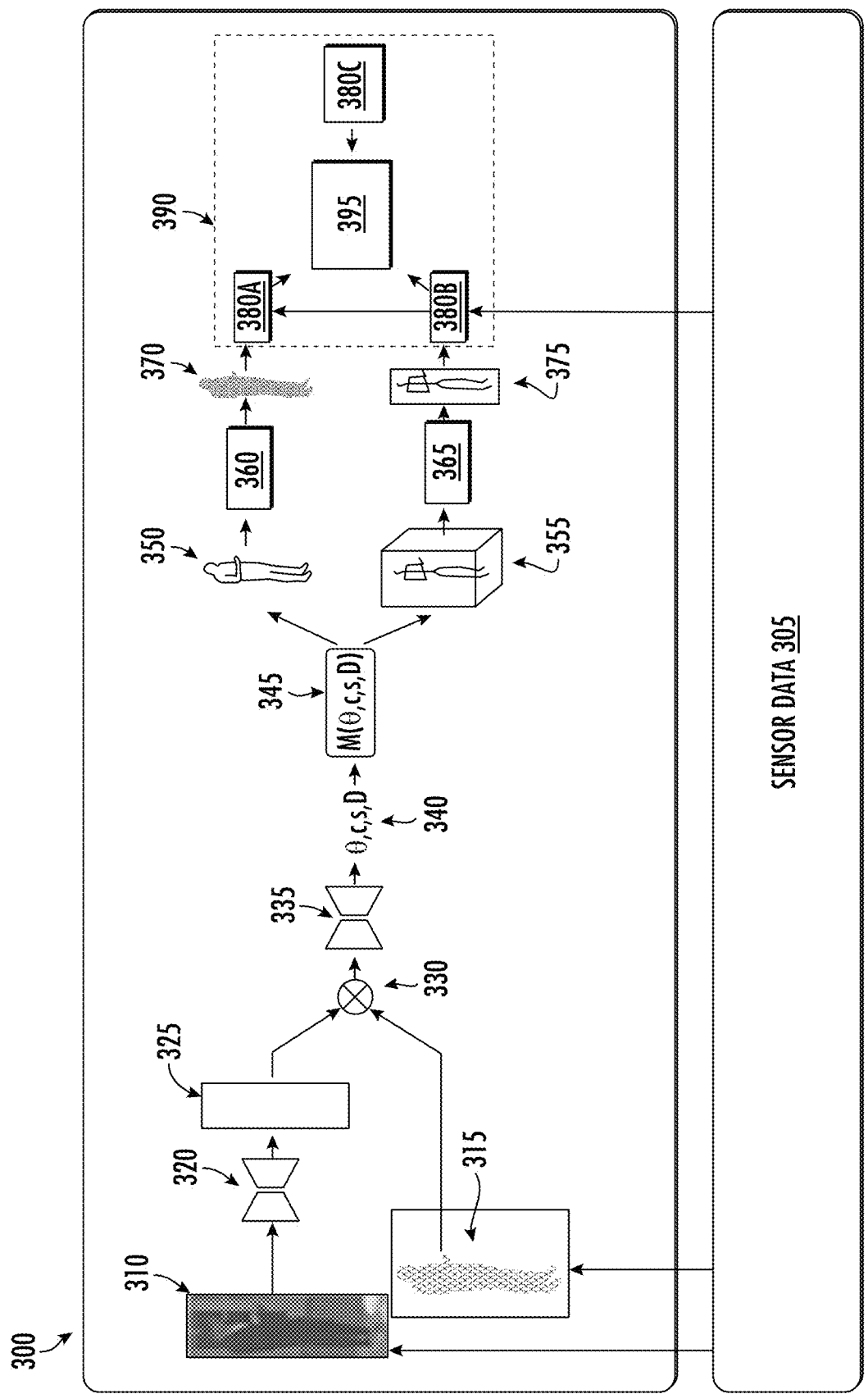
FIG. 3 is a system configured to generate sequences of object model parameters, according to some implementations of the present disclosure.

FIG. 3 is a system 300 configured to generate sequences of object model parameters, according to some implementations of the present disclosure. A dynamic object representation can be indicative of at least a portion of an environment in which a robotic platform operates. The system 300 can include any of the system(s) (e.g., robotic platform 105, autonomous vehicle 205, vehicle computing system 210, remote computing system 290B, operations computing system 290A, etc.) described herein such as, for example, with reference to FIGS. 1, 2, etc. The system 300 can be configured to generate dynamic object representations 345 from sequential sensor data to provide a bank of dynamic object models for use in generating diverse training simulations for training machine-learning models at scale. To do so, the system 300 can recover the shape and motion of dynamic objects such as pedestrians from sensor readings captured in the wild by an autonomous vehicle (e.g., vehicle 205 of FIG. 2). As described herein, the problem can be formulated as an energy minimization problem in a deep structured model that exploits object (e.g., human, animal, etc.) shape priors, consistency with two-dimensional poses extracted from two-dimensional data (e.g., images, etc.), and a ray-caster that encourages a reconstructed mesh to agree with three-dimensional (e.g., LiDAR, etc.) readings.

More specifically, the system 300 can obtain sensor data 305. The sensor data 305 can be indicative of at least one dynamic object within at least one environment of a computing system such as, for example, the system 300, an autonomous vehicle (e.g., vehicle 205), a robotic platform (e.g., platform 105), or any other system (or combination thereof) configured to obtain sensor information associated with a real world environment or one or more dynamic objects therein. The sensor data 305 can include two-dimensional data 310 (e.g., image data, etc.), three-dimensional data 315 (e.g., depth data, etc.), processed two/three dimensional data, or any other data associated with one or more real world environments or dynamic objects.

The two-dimensional data 310 can include image data defining at least one real world environment or at least one dynamic object. For example, the image data can define a plurality of dynamic objects moving within a real world environment. The image data can include a plurality of image frames (e.g., red, green, blue (RGB) image frames, etc.) captured through one or more image capturing devices (e.g., of the robotic platform, vehicle, etc.). For instance, the plurality of image frames can depict at least one dynamic object from different perspective(s) or at one or more times. By way of example, the image frames can include one or more image sequences. Each camera image sequence can include a plurality of image frames corresponding to one or more times. The plurality of image frames, for example, can include one or more image frames captured at one or more times. For instance, an image sequence can include one or more image frames corresponding to (e.g., captured at) a first time and one or more sequential image frames corresponding to (e.g., captured at) one or more second times subsequent to or preceding the first time.

The three-dimensional data 315 can include depth data. The depth data can include positional information for one or more objects (e.g., static, background, dynamic, etc.) within a field of view of one or more sensors (e.g., LiDAR sensors, RADAR sensors, etc.). For example, the depth data can include a three-dimensional point cloud (e.g., a LiDAR point cloud, etc.) indicative of a relative position of the one or more features or objects within an environment. By way of example, the three-dimensional data 315 can include one or more sparse LiDAR point clouds (e.g., data captured through sixty-four-beam LiDAR sweeps at ten hertz, etc.) captured through one or more LiDAR sensor(s) (e.g., of the robotic platform, autonomous vehicle, etc.). The one or more point cloud(s) can represent the at least one dynamic object at one or more times. As an example, the point cloud(s) can include at least one point cloud corresponding to (e.g., captured at) a first time and one or more sequential point clouds corresponding to (e.g., captured at) one or more second times subsequent to or preceding the first time.

In some implementations, the sensor data 305 can include two-dimensional data 310 (e.g., image data) or three-dimensional data 315 (e.g., depth information, etc.) centered or cropped around a dynamic object (e.g., rigid objects, non-rigid objects such as a pedestrian, animal, etc.). For example, the sensor data 305 can include data processed to identify one or more dynamic objects within a real world environment. The processed data can include one or more bounding boxes enclosing dynamic objects (e.g., pedestrians, animals, etc.) represented by the two- or three-dimensional data 310, 315. For instance, the data can include three-dimensional bounding boxes enclosing the dynamic object(s). In some implementations, the sensor data 305 can include two- or three-dimensional data 310, 315 cropped according to the one or more three-dimensional bounding boxes.

The system 300 provides input data 330 descriptive of the sensor data 305 as an input to the machine-learned object parameter estimation model 335. The machine-learned object parameter estimation model 335 (or a portion thereof) can be stored in one or more memories of the system 300. In addition, or alternatively, the machine-learned object parameter estimation model 335 (or a portion thereof) can be stored on one or more additional devices communicatively coupled to the system 300. The object parameter estimation model 335 generates a plurality of object model parameters 340 in response to receipt of the input data 330. The object model parameters 340 may be indicative of at least one of a pose or a shape modification with respect to a template object model. The plurality of object model parameters 340 can represent a three-dimensional dynamic object model 345 indicative of an object pose or an object shape for the dynamic object.

The input data 330 can include processed two/three dimensional data such as, for example, a plurality of three-dimensional datapoints. For example, the two-dimensional data 310 can be input to a machine-learned image segmentation model 320 to determine a feature map 325 for the two-dimensional data 310. The feature map 325, for example, can be a data structure descriptive of one or more image features of the two-dimensional data 310. The image features can be, for example, descriptive of one or more pixel classifications (e.g., corresponding object classifications, edge classifications, color classifications, etc.) for each of a plurality of pixels of the two-dimensional data 310. The machine-learned image segmentation model 320 can include any type of machine-learned model such as, for example, one or more convolutional neural networks ("CNNs") trained to compute image features (e.g., feature map 325, etc.) based, at least in part, on input two-dimensional data 310.

The input data 330 can be generated by applying bilinear interpolation to sample corresponding image features for each three-dimensional point (e.g., LiDAR point, etc.) of the three-dimensional data 315. Bilinear interpolation, for example, can be applied using geometry or camera calibration. At least one three-dimensional point (or each of the points, etc.) of the three-dimensional data 315 can be concatenated with a plurality of image features of the feature map 325 to generate the input data 330. In this manner, input data 330 can be generated that includes a plurality of three-dimensional datapoints associated with a plurality of image features or corresponding depth information.

The input data 330 (e.g., a plurality of LiDAR points with concatenated image features, etc.) is consumed by the machine-learned object parameter estimation model 335 to predict the one or more object model parameters 340. The machine-learned object parameter estimation model 335 may be or include any type or number of machine-learned models. As examples, the machine-learned object parameter estimation model 335 may be or otherwise include various machine-learned models such as, for example, neural networks (e.g., deep neural networks), support vector machines, decision trees, ensemble models, k-nearest neighbors models, Bayesian networks, generative adversarial networks, or other types of models including linear models or non-linear models.

In some implementations, the machine-learned object parameter estimation model 335 is a self-supervised regression model. The self-supervised regression model can be trained to minimize a loss function. The loss function can be defined as the objective function 390 configured to measure the accuracy of one or more object model parameters 340 output by the machine-learned object parameter estimation model 335. As described in further detail herein, the accuracy of the one or more object model parameters 340 can be measured by a three-dimensional consistency measure 380A, a joint consistency measure 380B, or a prior consistency measure 380C. The three-dimensional consistency measure 380A, joint consistency measure 380B, and/or prior consistency measure 380C, for example, can include one or more parameters of the object function 390. The three-dimensional consistency measure 380A can measure the consistency between a three-dimensional mesh representation 350 of the dynamic object and the three-dimensional data 315. The joint consistency measure 380B can measure the consistency between the three-dimensional set of interconnected joints 355 representative of the dynamic object and the two-dimensional data 310. The prior consistency measure 380C can measure the consistency between the plurality of object model parameters 340 and one or more previous dynamic object observations. The machine-learned object parameter estimation model 335 can be trained to minimize the loss associated with the three-dimensional consistency, the joint consistency, or the prior consistency measure(s) 380A-C. In this manner, the machine-learned object parameter estimation model 335 can be trained without labeled training data in a self-supervised fashion.

The regression model 335 can be configured to output the object model parameters 340 with respect to a template object model. The template object model can include one or more blend-skinning models such as, for example, linear blend ("LBS") skinning models, spherical models, non-skeleton based skinning methods, skinned multi-person linear models ("SMPL"), etc. By way of example, the template object model can include a linear blend skinning model. In some implementations, the template object model can include a linear blend skinning model enhanced with bone scaling or per-vertex deformations representative of how a dynamic body (e.g., a pedestrian, human, animal, etc. body) deforms as a function of its pose.

The template object model (e.g., enhanced LBS model, etc.) can include a template mesh representation or a template hierarchical set of interconnected bones (e.g., a skeleton). The template object model can represent a dynamic object (e.g., a pedestrian body) using the template mesh representation and the template hierarchical set of interconnected bones. For example, each bone in the hierarchical set of interconnected bones can be associated with some portion of the dynamic object's visual representation (e.g., a set of vertices, etc.). By way of example, each mesh vertex (e.g., of the mesh representation) can include a particular blend weight corresponding to each bone of the hierarchical set of interconnected bones. An object model 345 for a specific dynamic object can include a transformation matrix for each bone of the hierarchical set of interconnected bones that, when applied to a respective vertex, first puts the vertex in bone space, and then puts it back into mesh space to calculate the final position of the vertex with respect to the template. The vertex can be scaled by its corresponding blend weight after the application of the transformation matrix.

As an example, the template mesh can be defined as $V \in \mathbb{R}^{N \times 3}$ with the set of N vertices $V=\{n_i\}_{i=1}^{N}$ (e.g., with oriented normals $\mathcal{N} =\{n_i\}_{i=1}^{N}$) and the set of blend weights can be defined as $W \in \mathbb{R}^{N \times K}$. In some implementations, the blend weights can be created, for example, by diffusing artist-annotated part-segmentations. The hierarchical set of interconnected bones (e.g., a skeletal pose) can be represented with a set of joint rotation matrices $\Theta_i \in SO(3)$. The set of joint rotation matrices can include at least one matrix for each joint representing the rotation with respect to its parent joint in the hierarchical set of interconnected bones (e.g., skeletal tree).

In order to accurately represent a plurality of different object sizes that deviate from the template mesh such as, for example, in the case of representing a number of unique human or other non-rigid bodies, the template object model can include a plurality of tunable model parameters. The plurality of tunable model parameters can include a learnable scale factor for at least one (or each) bone in the hierarchical set of interconnected bones (e.g., skeleton). The learnable scale factor, for example, can be defined such that $s_p$ denotes the bone length scale factor between the p-th joint and its parent joint. In some implementations, the bone length scale factor can be modeled to be symmetric with respect to the object spine such that left/right arms, legs, etc. can share the same bone scale factor. A respective transformation matrix can be determined for each joint of the hierarchical set of interconnected bones such that: $T_k(\eta) \in SE(3)$:

$$T_k(s, \Theta) = \prod_{p \in A(k)} \begin{bmatrix} S_p \Theta_p & (I - S_p \Theta_p) j_p \\ 0 & 1 \end{bmatrix}$$

where A(k) is the set of joint ancestors of the k-th joint in order, $\Theta p$ is the rotation matrix of the p-th joint with respect to its parent, and $j_p$ is the coordinate of the p-th joint in the template mesh. The coordinate for the i-th vertex can be computed as a linear combination of the joint transformation matrices and its unique blend weights.

In addition, or alternatively, the plurality of tunable model parameters can include a displacement vector for each vertex of the template mesh. For example, the coordinate for the i-th vertex and the k-th joint in the posed mesh can be computed as:

$$\bar{v}_i = \Sigma_{k=1}^{K} T_k(s,\Theta)(v_i+n_i d_i) w_{i,k}+c, \bar{J}_k=T_k(s,\Theta) j_k+c$$

where $w_{i,j}$ can be the skinning weight describing the influence of the k-th joint on the i-th vertex in the template shape (e.g., of the template object model), and $c \in \mathbb{R}^3$ can be the global translation of the root joint. The final posed mesh model can be denoted as:

$$M = \mathcal{M}_{(W,V,\mathcal{N},\Theta,c,s,D)}$$

with posed mesh M, blend weights W, mesh vertices V, normals $\mathcal{N}$, and tunable object parameters including tunable joint angles $\Theta$, root location c, bone scale factors s, and per-vertex deformation matrix D.

The machine-learned object parameter estimation model 335 can be configured to output at least one model parameter value for at least one (or each) of the tunable object parameters. For example, the plurality of model parameters 340 can include at least one of (i) a plurality of joint angles (e.g., denoted as $\Theta$) corresponding to the template hierarchical set of interconnected bones, (ii) a plurality of offsets (e.g., denoted as c) corresponding to the template hierarchical set of interconnected bones, (iii) a plurality of scale factors (e.g., denoted as s) corresponding to the template hierarchical set of interconnected bones, or (iv) a plurality of deformations (e.g., denoted as D) corresponding to the template mesh representation. The plurality of model parameters 340 can be applied to the template object model to create an object model 345 descriptive of an object shape and object pose corresponding to the object represented by the input data 330.

By way of example, for reconstructions, the object model 345 can use fixed skinning weights W, template shape V, and normals $\mathcal{N}$ associated with the template object model. The input data 330 can be input to the machine-learned object parameter estimation model 335 to infer pose (joint angles $\Theta$, offset c) and shape modifications (joint scale factors s and deformations D) with respect to the fixed parameters. The resulting plurality of model parameters 340 can parameterize a three-dimensional object model 345 descriptive of the unique pose and shape of the dynamic object. In some implementations, two branches of the machine-learned object parameter estimation model 335 can be run, in which the root joint angle is initialized to either face forward(0°) or backward (180°). In such a case, hindsight loss can be performed during training in which the result with the lower loss during inference can be provided to the objective function 390.

The system 300 can generate at least a portion of simulation data based, at least in part, on the plurality of object model parameters 340. The simulation data, for example, can include data indicative of one or more environments or dynamic objects. As one example, at least a first portion of the simulation data can include simulated environmental data and at least a second portion of the simulation data can include simulated dynamic object data. The simulated dynamic object data can include a dynamic object database (e.g., database 505 depicted by FIG. 5). The dynamic object database can include a plurality of sets of object model parameters corresponding to a plurality of dynamic objects. Each set of object model parameters, for example, can be indicative of at least a portion of an object trajectory.

For example, the simulation data can include a plurality of sequences of object model parameters (e.g., a set of object model parameters) descriptive of a plurality of dynamic objects. Each sequence of object model parameters can be indicative of a trajectory of a respective dynamic object over time. The trajectory, for example, can be indicative of at least one or more velocities, directions of travel, one or more future locations, or any other information indicative of the location or movement of a respective dynamic object over time.

In some implementations, the machine-learned object parameter estimation model 335 can determine a sequence of object model parameters for the dynamic object based, at least in part, on the input data 330. For example, the two-dimensional data 310 can correspond to a first time and the three-dimensional data 315 can correspond to the first time. The machine-learned object parameter estimation model 335 can determine the plurality of object model parameters 340 that correspond to the first time based on the two- and three-dimensional data 310, 315.

In addition, the input data 330 can include sequential sensor data 305 (e.g., sequential image data, sequential LiDAR data, etc.) indicative of the dynamic object at one or more second times subsequent to or preceding the first time. The sequential sensor data 305, for example, can include two-dimensional data 310 and three-dimensional data 315 corresponding to each of the one or more second times subsequent to or preceding the first time. The machine-learned object parameter estimation model 335 can obtain the sequential sensor data 305 indicative of the dynamic object at the one or more second times and determine a plurality of sequential object model parameters corresponding to each of the one or more second times. The plurality of object model parameters 340 and the plurality of sequential object model parameters can be associated to generate a sequence of object model parameters corresponding to the dynamic object. The sequence of object model parameters can be descriptive of a respective object pose or object shape for the dynamic object model at the first or second time(s). In this manner, the sequence of object model parameters can be descriptive of the movement (e.g., change in shape, pose, etc.) or trajectory of the dynamic object.

The plurality of object model parameters 340, the plurality of sequential object model parameters, or the sequence of object model parameters can be stored in the dynamic object database as a set of object model parameters corresponding to the dynamic object. In addition, or alternatively, the plurality of object model parameters 340, the plurality of sequential object model parameters, or the sequence of object model parameters can be enhanced before storage. For example, the system 300 can be configured to generate a plurality of enhanced object model parameters 395, a plurality of enhanced sequential object model parameters, or a sequence of enhanced object model parameters based, at least in part, on the two-dimensional data 310 or the three-dimensional data 315 corresponding to the dynamic object and the objective function 390.

For example, the plurality of object model parameters 340 can be refined using the objective function 390 to enhance one or more consistencies between the plurality of object model parameters 340 (or sequential object model parameters), the two- and three-dimensional data 310, 315 indicative of the dynamic object, or one or more prior object poses indicative of previously observed (e.g., typical) dynamic objects (e.g., pedestrians, etc.). For example, the machine-learned object parameter estimation model 335 can be used to predict the initial estimates of the plurality of model parameters 340 (or sequential object model parameters) from input data 330 (e.g., corresponding to the plurality of object model parameters). The initial estimates (the object model parameters 340) can be refined through the performance of energy minimization techniques based on the application of the objective function 390 to one or more representations (e.g., an initial simulated three-dimensional point cloud 370, two-dimensional set of interconnected joints 375, etc.) of the plurality of object model parameters 340.

The objective function 390 can be defined to capture the three-dimensional consistency measure 380A, the joint consistency measure 380B, or the prior consistency measure 380C for the plurality of model parameters 340. The three-dimensional consistency measure 380A (e.g., denoted $E_{sim}$) can capture the fact that a three-dimensional mesh representation 350 indicative of the object shape of the dynamic object should be consistent with the three dimensional data (e.g., point clouds from the LiDAR measurements). The joint consistency measure 380B (e.g., denoted $E_{joint}$) can capture the fact that the estimated three-dimensional set of interconnected joints 355 indicative of an object pose of the dynamic object should be consistent with two-dimensional joints estimated from the two-dimensional data 310 (e.g., images). The prior consistency measure 380C (e.g., denoted $E_{prior}$) can be applied to regularize poses to be natural and ensure the deformed shape is smooth without having large deviations from the mesh template. The objective function 390 can be denoted as:

$$E(\Theta_{1:T}, C_{1:T}, S, D) = \sum_t \lambda_{sim} E_{sim}(\Theta_{t,Ct,S}, D) + \lambda_{joint} E_{joint}(\Theta_{t,Ct,S}) + E_{prior}(\Theta_{t,S}, D)$$

where t is the time step in the dynamic object trajectory, and $\Theta_{1:T}$, $c_{1:T}$ are the sequence of pose joint angles and root offsets.

The objective function 390 can be configured to determine the three-dimensional consistency measure 380A based, at least in part, on the plurality of object model parameters 340 and the three-dimensional data 315 indicative of the dynamic object. To do so, the system 300 can generate a three-dimensional mesh representation 350 of the dynamic object based, at least in part, on the plurality of object model parameters 340. For example, the plurality of object model parameters 340 can be applied to the template mesh to generate a three-dimensional parameterization 345 of the three-dimensional mesh representation 350. The three-dimensional mesh representation 350 can be indicative of an initial object shape for the dynamic object.

The system 300 can determine an initial simulated three-dimensional point cloud 370 for the dynamic object based, at least in part, on the three-dimensional mesh representation 350. For example, the three-dimensional mesh representation 350 can be input to one or more algorithms 360 to convert the three-dimensional mesh representation 350 to the initial simulated three-dimensional point cloud 370. By way of example, a ray casting algorithm 360 (e.g., a Moller-Trumbore algorithm, etc.) can be exploited to determine a point cloud based, at least in part, on the three-dimensional mesh representation 350. In some implementations, the ray casting algorithm 360 can be differentiable with respect to mesh vertices such that the full model (e.g., machine-learned object parameter estimation model 335, ray-casting algorithm 360, etc.) can be trained end-to-end.

Figure 4:
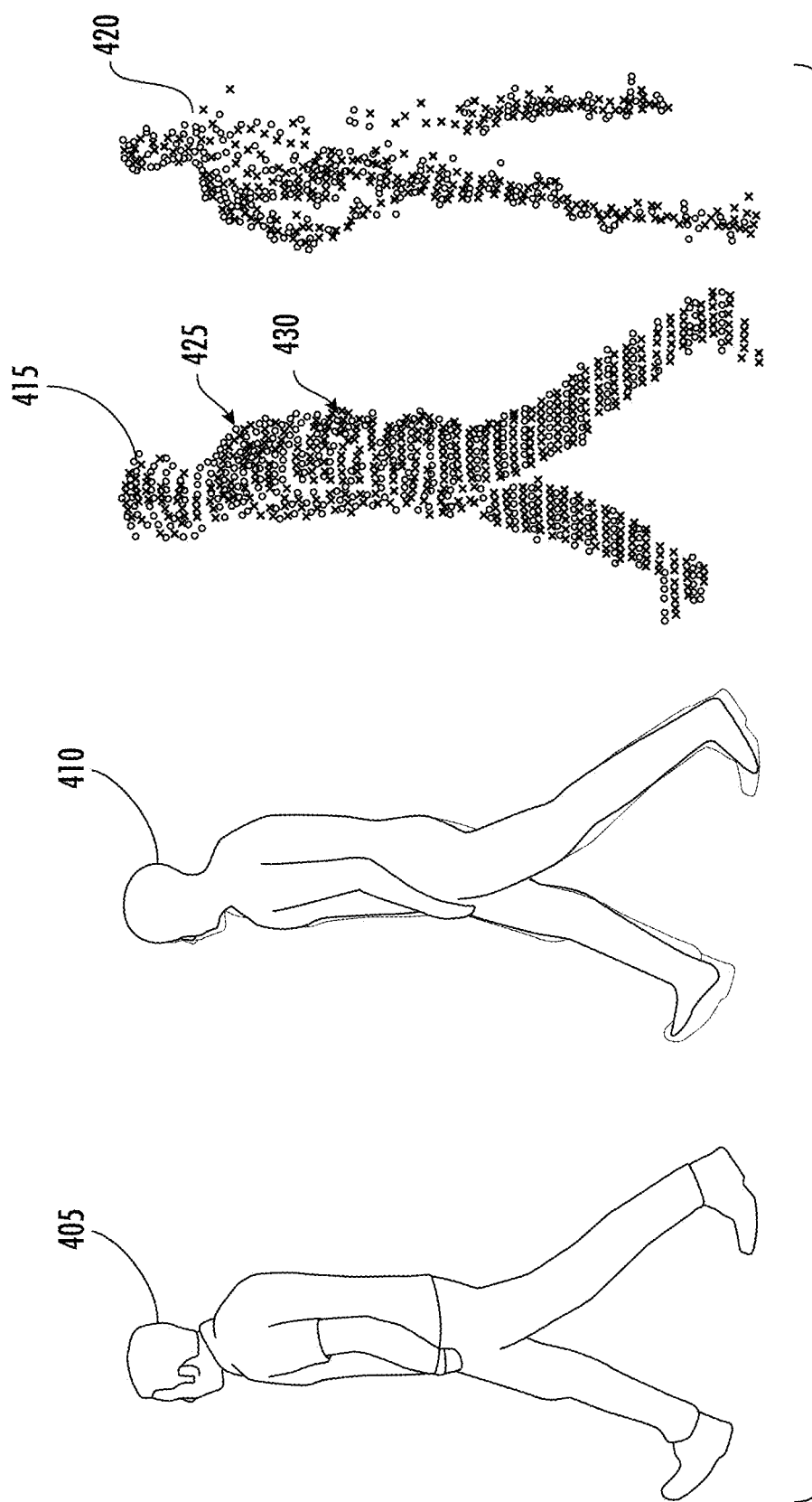
FIG. 4 is a diagram of three-dimensional representations, according to some implementations of the present disclosure.

FIG. 4, for example, is a diagram of three-dimensional representations, according to some implementations of the present disclosure. FIG. 4 depicts two-dimensional data 405, a three-dimensional mesh representation 410, and initial simulated three-dimensional point clouds 415, 420. The initial simulated three-dimensional point clouds include an initial simulated three-dimensional point cloud from a front view 415 and an initial simulated three-dimensional point cloud from a side view 420 for illustrative purposes. The initial simulated three-dimensional point clouds 415, 420 include a plurality a ray-casted points 425 based on the three-dimensional mesh representation 410 and a plurality of LiDAR points 430 based on the three-dimensional data input to the machine-learned object parameter estimation model 335.

Turning back to FIG. 3, the system 300 can generate a plurality of enhanced object model parameters 395 based, at least in part, on the initial simulated three-dimensional point cloud 370, the three-dimensional data 315, and the objective function 390. For example, the system 300 can determine a three-dimensional consistency measure 380A based, at least in part, on the initial simulated three-dimensional point cloud 370, the three-dimensional data 315, and the objective function 390. For example, the computing system 300 can apply the objective function 390 to the initial simulated three-dimensional point cloud 370 and the three-dimensional data 315 to determine the three-dimensional consistency measure 380A for the plurality of object model parameters 340. The three-dimensional consistency measure 380A can be indicative of a consistency between the three-dimensional mesh representation 350 of the dynamic object and the three-dimensional data 315. The system 300 can generate the plurality of enhanced object model parameters 395 based, at least in part, on the three-dimensional consistency measure 380A. The plurality of enhanced object model parameters 395, for example, can be generated by performing energy minimization over the initial object model parameters 340 based, at least in part, on the three-dimensional consistency measure 380A.

The three-dimensional consistency measure 380A (e.g., a LiDAR consistency term) can encourage the initial simulated three-dimensional point cloud 370 (e.g., ray-casted point cloud) from the three-dimensional mesh representation 350 (e.g., estimated mesh $M(\Theta_t, c_t, s, D)$) to match with the three-dimensional data 315 (e.g., real partial point cloud X) of the dynamic object (e.g., pedestrian, etc.) through the Chamfer loss:

$$E_{sim}(\Theta_{t_i}, c_t t, s, D) = \frac{1}{|X|} \sum_{x \in X} \min_{y \in Y} \|x - y\|_2^2 + \frac{1}{|Y|} \sum_{y \in Y} \min_{y \in X} \|y - x\|_2^2$$

where |X| denotes the cardinality of point set X, and Y= $\{y_1 \ldots y_n | y_i \in \mathbb{R}^3\}$ is the initial simulated three-dimensional point cloud 370 (e.g., rendered points) from the three-dimensional mesh representation 350 (e.g., the estimated mesh). When computing $E_{sim}$, the system 300 can take into account objects that occlude a respective sensor's field-of-view of the dynamic object (e.g., pedestrian, etc.) and ignore simulated points from the ray-caster 360 that would not appear due to occlusion.

The objective function 390 can be configured to determine the joint consistency measure 380B based, at least in part, on the plurality of object model parameters 340 and the two-dimensional data 310 indicative of the dynamic object. To do so, the system 300 can generate a three-dimensional set of interconnected joints 355 representative of the dynamic object based, at least in part, on the plurality of object model parameters 340. For example, the plurality of object model parameters 340 can be applied to the template model to generate a three-dimensional parameterization 345 the three-dimensional set of interconnected joints 355. The three-dimensional set of interconnected joints 355 can be indicative of an initial object pose for the dynamic object.

The system 300 can determine a two-dimensional set of interconnected joints 375 for the dynamic object based, at least in part, on the three-dimensional set of interconnected joints 355. For example, the three-dimensional set of interconnected joints 355 can be projected (e.g., through one or more projection algorithm(s) 365) to a two-dimensional space to determine the two-dimensional set of interconnected joints 375.

In some implementations, the system 300 can generate the plurality of enhanced object model parameters 395 based, at least in part, on the two-dimensional set of interconnected joints 375, the two-dimensional data 310, and the objective function 390. For example, the two-dimensional set of interconnected joints 375 can be compared to a set of predicted two-dimensional joints derived from the two-dimensional data 310 to determine the joint consistency measure 380B. For instance, the system 300 can apply the objective function 390 to the two-dimensional set of interconnected joints 375 and the two-dimensional data 310 to determine the joint consistency measure 380B for the plurality of object model parameters 340. The joint consistency measure 380B can be indicative of a consistency between the three-dimensional set of interconnected joints 355 representative of the dynamic object and the two-dimensional data 310.

The system 300 can generate the plurality of enhanced object model parameters 395 based, at least in part, on the joint consistency measure 380B. The plurality of enhanced object model parameters 395, for example, can be generated by performing energy minimization over the initial object model parameters 340 based, at least in part, on the joint consistency measure 380B.

The joint consistency measure 380B can exploit two-dimensional data 310 (e.g., camera images) by detecting the set of predicted two-dimensional joints using one or more pose estimators (e.g., any of a plurality of different state-of-the-art two-dimensional pose estimators). The objective function 390 can encourage the two-dimensional set of interconnected joints 375 (e.g., projection of the predicted three-dimensional pose) to be consistent with the set of predicted two-dimensional joints detected from the two-dimensional data 310:

$$E_{joint}(\Theta_{t_i} c_t, s) = \sum_{k \in B} m_k \rho(\pi(j_k, \Omega) - p_k)$$

where $j_k$ can be the k-th joint transformed according to the transformation matrices described herein, B can be a subset of the three-dimensional set of interconnected joints 355 that have two-dimensional counterparts, and $p_k$ and $m_k$ can be the corresponding estimated two-dimensional joint and confidence score. $\pi$ can be the projection function that takes two-dimensional parameters $\Omega$ (e.g., camera parameters) and projects the three-dimensional joint locations onto the image plane. The two-dimensional parameters $\Omega$, for example, can be given as cameras of self-driving cars are calibrated. $\rho$ can be the $\sigma^2$-scaled Geman-McClure robust penalty function defined as $\rho(x)=(x^2 * \sigma^2)/(x^2+\sigma^2)$, with $\sigma=100$.

In some implementations, the objective function 390 can be configured to determine a prior consistency measure 380C based, at least in part, on the plurality of object model parameters 340 and a pose prior (e.g., one or more previous dynamic object observations). For example, the system 300 can incorporate prior knowledge of reasonable human poses and shapes to be robust to noisy sensor data 305. For joint angles the previous dynamic object observations can include a joint angle prior represented as a negative log-likelihood of a Gaussian Mixture Model (GMM) learned from a motion capture dataset (e.g., CMU Mocap dataset). In addition, the previous dynamic object observations can include a bone scale prior that encourages the bone length to be close to a canonical size. The pose prior can be denoted as:

$$E_{pose}(\Theta_t, s) = -\left(\log \sum_r^R g_r \mathcal{N}(\Theta; \mu_r, \Sigma_r)\right) + \lambda \sum_k^K \left(\prod_{p \in A(k)} S_p - 1\right)^2$$

with R=8 Gaussians, $(g_r, \mu_r, \Sigma_r)$ the weight, mean and covariance of the p-th Gaussian, and $\Pi_{p \in A(k)} s_p$ the cumulated scale factor for the bone length between the k-th joint and its ancestors. To ensure the three-dimensional dynamic object model 345 (e.g., the deformed mesh) still retains most of the mesh template shape and has smoothly-varying and small deformations, a Laplacian mesh regularizer and $\ell_2$ regularizer can be added, respectively:

$$E_{shape}(D) = \sum_{i=1}^{N} \|\mathcal{L}(v_i + n_i d_i) - \mathcal{L}(v_i)\|\frac{2}{2} + \lambda \sum_{i=1}^{N} d_i^2$$

where $v_i$ and $n_i$ are the vertex location and normal in the mesh template, $d_i$ is the corresponding displacement along the normal direction, and $\mathcal{L}$ is the Laplace operator. The total pose prior can be defined as:

$$E_{prior}(\Theta_t, s, D) = \lambda_{pose} E_{pose}(\Theta, s) + \lambda_{shape} E_{shape}(D)$$

The computing system 300 can apply the objective function 390 to the plurality of object model parameters 340 and the pose prior to determine the prior consistency measure 380C for the plurality of object model parameters 340. The system 300 can generate the plurality of enhanced object model parameters 395 based, at least in part, on the prior consistency measure 380C. The plurality of enhanced object model parameters 395, for example, can be generated by performing energy minimization over the initial object model parameters 340 based, at least in part, on the prior consistency measure 380C.

In some implementations, the computing system 300 can generate the plurality of enhanced object model parameters 395 based, at least in part, on the three-dimensional consistency measure 380A, the joint consistency measure 380B, and the prior consistency measure 380C. For example, the computing system 300 can perform an energy minimization function to modify the plurality of object model parameters 340 based, at least in part, on the three-dimensional consistency measure 380A, the joint consistency measure 380B, or the prior consistency measure 380C to generate the plurality of enhanced object model parameters 395. The plurality of object model parameters 340, for example, can be modified to increase (i) the consistency between the three-dimensional mesh representation 350 of the dynamic object and the three-dimensional data 315 (e.g., by decreasing the three-dimensional consistency measure 380A), (ii) the consistency between the three-dimensional set of interconnected joints 355 representative of the dynamic object and the two-dimensional data 310 (e.g., by decreasing the joint consistency measure 380B), or (iii) the consistency between the plurality of object model parameters 340 and the pose prior (e.g., by decreasing the prior consistency measure 380C).

By way of example, the computing system 300 can perform a forward pass for each set of input data 330 including a two- and three-dimensional data (e.g., a pedestrian frames)) at a respective time and output the initial model parameters 340. These predictions 340 can then be further refined by minimizing the differentiable energy (e.g., defined by objective function 390) which obtains the final pose and shape of each dynamic object (e.g., pedestrian, animal, etc.) at each two- and three dimensional frame. In some implementations, a two-step energy minimization can be performed in which the system 300 first optimizes $\Theta_{1:T}$, $c_{1:T}$, s until convergence, and then optimizes the deformation variable D until convergence. Each sub-step can converge in one or more iterations such as, for example, fifty iterations, etc. The Adam optimizer (e.g., or any second-order optimizer) can be adopted in some implementations.

Figure 5:
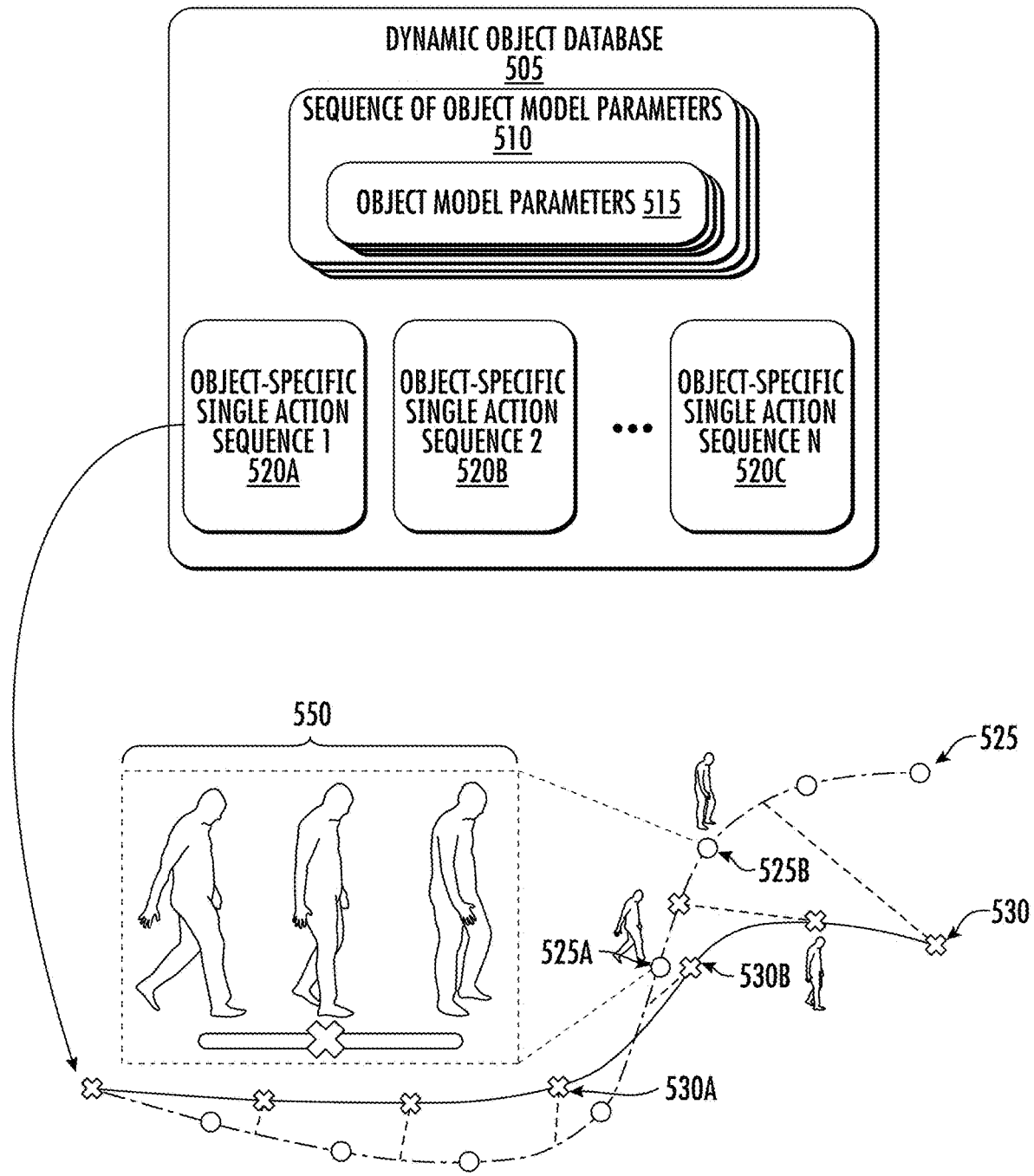
FIG. 5 is a diagram of a trajectory selection from an example dynamic object database, according to some implementations of the present disclosure.

FIG. 5 is a diagram of a trajectory selection from an example dynamic object database, according to some implementations of the present disclosure. As described herein, with reference to the previous figures, a computing system (e.g., computing system 300 of FIG. 3, etc.) can generate a plurality of enhanced object model parameters 515 indicative of the shape and pose of a dynamic object represented by real world data. The plurality of object model parameters 515 (e.g., enhanced parameters 395 of FIG. 3) can be stored in the dynamic object database 505. In some implementations, the dynamic object database 505 can include a plurality of object-specific single action sequences 520A-C descriptive of a plurality of dynamic objects.

For example, the computing system can determine one or more object actions corresponding to a sequence of object model parameters 510 (e.g., a plurality of sequential initial/enhanced object model parameters 515, etc.) based, at least in part, on one or more trajectories (e.g., velocities, directions of travel, future locations, etc.) exhibited by a respective dynamic object (e.g., a change of object shapes or poses over time, etc.). The computing system can generate the one or more single action sequences 520A-C from the sequence of object model parameters 510 based, at least in part, on the sequence of object model parameters 510 and the one or more object actions corresponding to the sequence of object model parameters 510. By way of example, each single action sequence 520A-C can include a portion of the sequence of object model parameters 510 corresponding to a respective object action. The computing system can store the one or more single action sequence(s) 520A-C in the dynamic object database 505 including the plurality of object-specific single action sequences 520A-C descriptive of the plurality of dynamic objects.

In this manner, an asset bank (e.g., database 505) of dynamic object sequences (e.g., pedestrian, animal, etc. sequences) and their corresponding meshes can be created directly from data captured in the real world such as, for example, by a fleet of autonomous vehicles (e.g., autonomous vehicle 205 of FIG. 2). Since the trajectories and mesh sequences in the asset bank (e.g., database 505) can be diverse (e.g., trajectories can be indicative of actions such as walking, running, standing, sitting, etc.) the sequence of object model parameters 510 can be clipped to ease the reuse of the action-specific pose dynamics. For instance, the sequence of object model parameters 510 can be clipped at each cyclic object trajectory (e.g., pedestrian trajectory, etc.) to consist of a single cycle, where the object poses (e.g., human poses for pedestrians, etc.) in the start and end frames are similar. An average object-specific single action sequence 520A-C(e.g., action cycle, etc.), for example, can include a length of 1.5 seconds.

Figure 6:
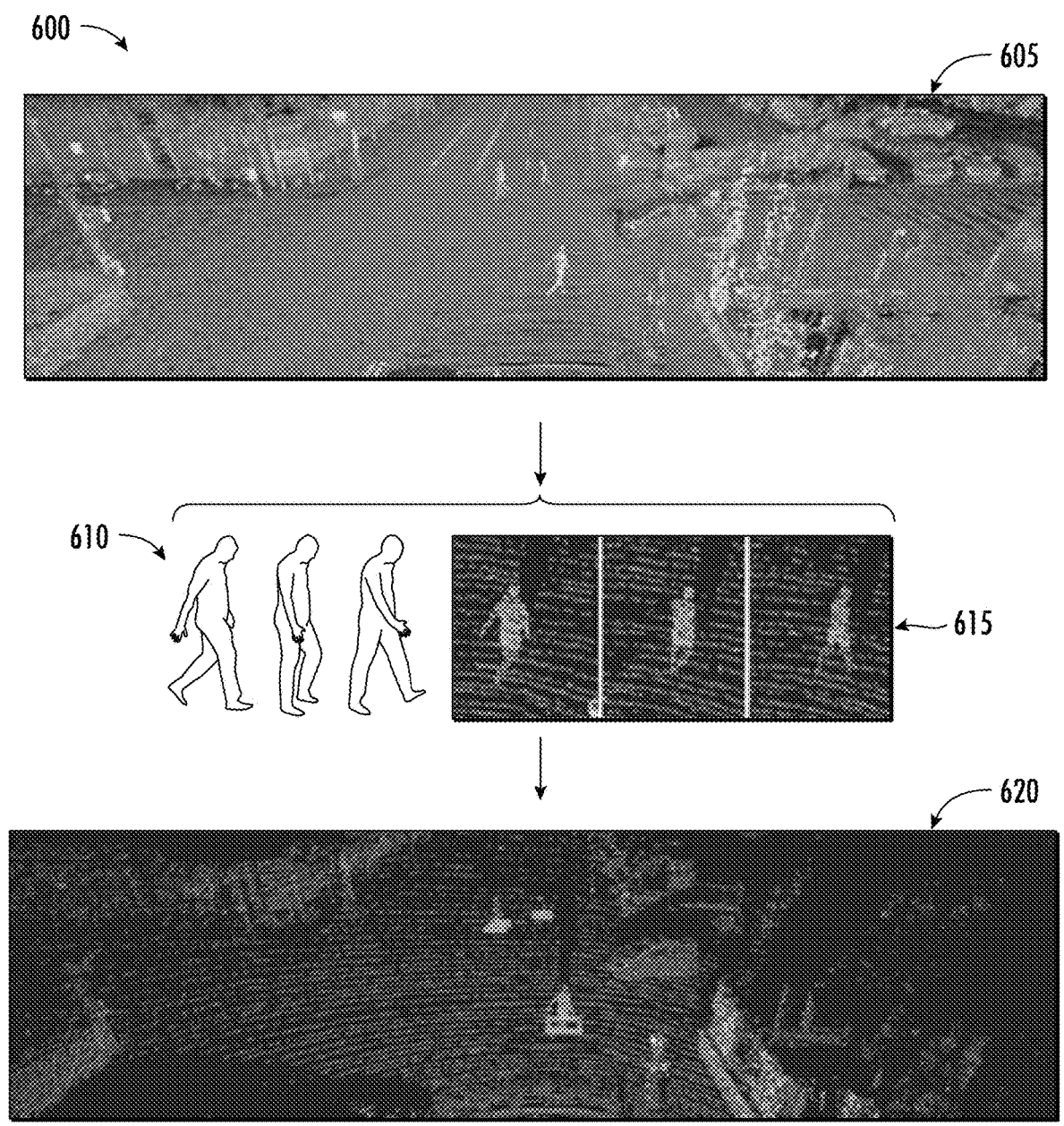
FIG. 6 is a diagram of a simulation sequence, according to some implementations of the present disclosure.

FIG. 6 is a diagram of a simulation sequence 600, according to some implementations of the present disclosure. The simulation sequence 600 depicts a simulation scene 605 including a plurality of three-dimensional points (e.g., LiDAR points, etc.) corresponding to a real-world or simulated environment; one or more dynamic object representations 615 including a plurality of three-dimensional points (e.g., LiDAR points, etc.) corresponding to one or more dynamic object models 610; and a simulated object scene 620 including the simulation scene 605 and the dynamic object representations 615.

The simulation sequence 600 illustrates various examples of simulation data. As described herein, at least a portion of the simulation data can include dynamic object representations 615 indicative of the shape, pose, or movements of a dynamic object. In addition, at least another portion of the simulation data can include simulation scene data 605 indicative of one or more simulated environments. The one or more simulated environments can include simulated environments (e.g., generated based on artist renderings, etc.) or real-world environments (e.g., generated based on real-world sensor data, etc.). The simulation scene data 605 can include a plurality of three-dimensional points descriptive of the environment. By way of example, the plurality of three-dimensional points can include LiDAR points. The plurality of three-dimensional points can be input to a machine-learned model (e.g., a machine-learning perception model, classification model, etc.) to simulate the reception of LiDAR data indicative of a respective environment.

In some implementations, the simulation data can include a simulated object scene 620 indicative of one or more movements of a respective dynamic object within a simulated environment (e.g., a simulation scene 605). For example, a computing system can obtain simulation scene data 605 indicative of the simulated environment. The computing system can obtain at least one of the plurality of object-specific single action sequences (e.g., dynamic object models 610) from the dynamic object database (e.g., database 505 of FIG. 5). As described herein, the at least one object-specific single action sequence can be indicative of the one or more movements of the respective dynamic object. The computing system can generate the simulated object scene 620 based, at least in part, on the simulation scene data 605 and the at least one object-specific single action sequence (e.g., dynamic object models 610). For example, the computing system can generate dynamic object representations 615 corresponding to the dynamic object models 610 can place the object representations 615 within the simulation scene 605.

More particularly, in order to produce realistic sensor simulation, the computing system can require a virtual world with realistic backgrounds (e.g., roads, buildings, signs, etc.) and dynamic objects (e.g., vehicles, pedestrians, etc.), as well as a sensor simulation system that has high-fidelity with the real three-dimensional data (e.g., LiDAR data). The computing system can utilize a sensor simulation system that uses real data to generate background scenes and vehicle dynamic objects. The sensor simulation system can place the dynamic objects in a scenario (e.g., provided by a labeled snippet, a tracking algorithm, artist-drawn trajectories, algorithmically, etc.) and render realistic three-dimensional representations 615 (e.g., LiDAR points) at each of a plurality of sequential time steps using physics and machine learning techniques. For example, a neural network can be used to enhance the realism of ray-casted three-dimensional points (e.g., LiDAR points) by determining which points would not return in the real world (e.g., due to spectral reflections, far distance, etc.). In some implementations, the sensor simulation system can be different from the ray-tracer of FIG. 3 (e.g., ray casting algorithm 360) such that it can be a high-performing ray-tracer to scale to millions of scene elements. The sensor simulation system, for example, can be non-differentiable.

The sensor simulation system can enhance a simulation scene 605 with object representations 615 (e.g., pedestrians, etc.) reconstructed using the techniques described herein. For example, turning back to FIG. 5, the computing system can receive one or more queries indicative of a respective query dynamic object or query trajectory 530 to be simulated within a simulation scene. For each new query object trajectory 530 (e.g., pedestrian trajectory) to be simulated, the system can select a dynamic object model 550 (e.g., pedestrian) associated with a similar asset trajectory 525 to the query object trajectory 530 (e.g., moving at a similar speed, etc.) from the dynamic object database 505 (e.g., asset bank), adapt it to the new scene, and simulate corresponding three-dimensional points (e.g., LiDAR data) based on the dynamic object models 550. By way of example, each asset trajectory 525 can include a respective object-specific single action sequence 520A from the dynamic object database 505. The respective object-specific single action sequence 520A can be indicative of a respective shape or pose 550 for a dynamic object at each of a plurality of time steps 525A-B of the asset trajectory 525. The asset trajectory 525 can be simulated by generating three-dimensional points (e.g., LiDAR data) for each respective shape or pose 550 for the dynamic object at each of the plurality of time steps 525A-B of the asset trajectory 525.

More particularly, the query object trajectory 530 can include a Bird's eye view (BEV) two-dimensional trajectory in a scene map as a high level description of the motion to simulate. The query object trajectory 530 can be received (e.g., through user input, etc.) from an existing trajectory (e.g., recovered from recorded snippets through tracking, labeling, etc.), can be drawn by a user (e.g., a test engineer, etc.), or can be produced algorithmically. In some implementations, labeled snippet trajectories can be used for the query object trajectory 530. A system can retrieve an asset (e.g., object-specific single action sequence 520A) in the asset bank (e.g., dynamic object database 530) which is most similar to the query object trajectory 530. In this regard, velocity, direction of travel, or movement patterns can be used as a similarity function (e.g., asset trajectory whose velocity is consistently within 0.5 m/s of the query trajectory's). The retrieved asset (e.g., object-specific single action sequence 520A) can be modified and retargeted to perform the desired motion indicated by the query object trajectory 530. Specifically, query object trajectory 530 can be projected to the retrieved asset trajectory 525 in BEV and one or more algorithms (e.g., SLERP, etc.) can be used to interpolate object poses (e.g., human poses) for each time-step 530A-B in the query trajectory 530. In some implementations, this modification can affect the plurality of corresponding object model parameters (e.g., joint angles or associated mesh).

In this manner, as depicted by FIG. 6, the system can simulate the simulated object scene 620 including the simulation scene 605 and the dynamic object representations 615 as seen by a sensor such as three-dimensional sensors including LiDAR sensors, etc.

Figure 7:
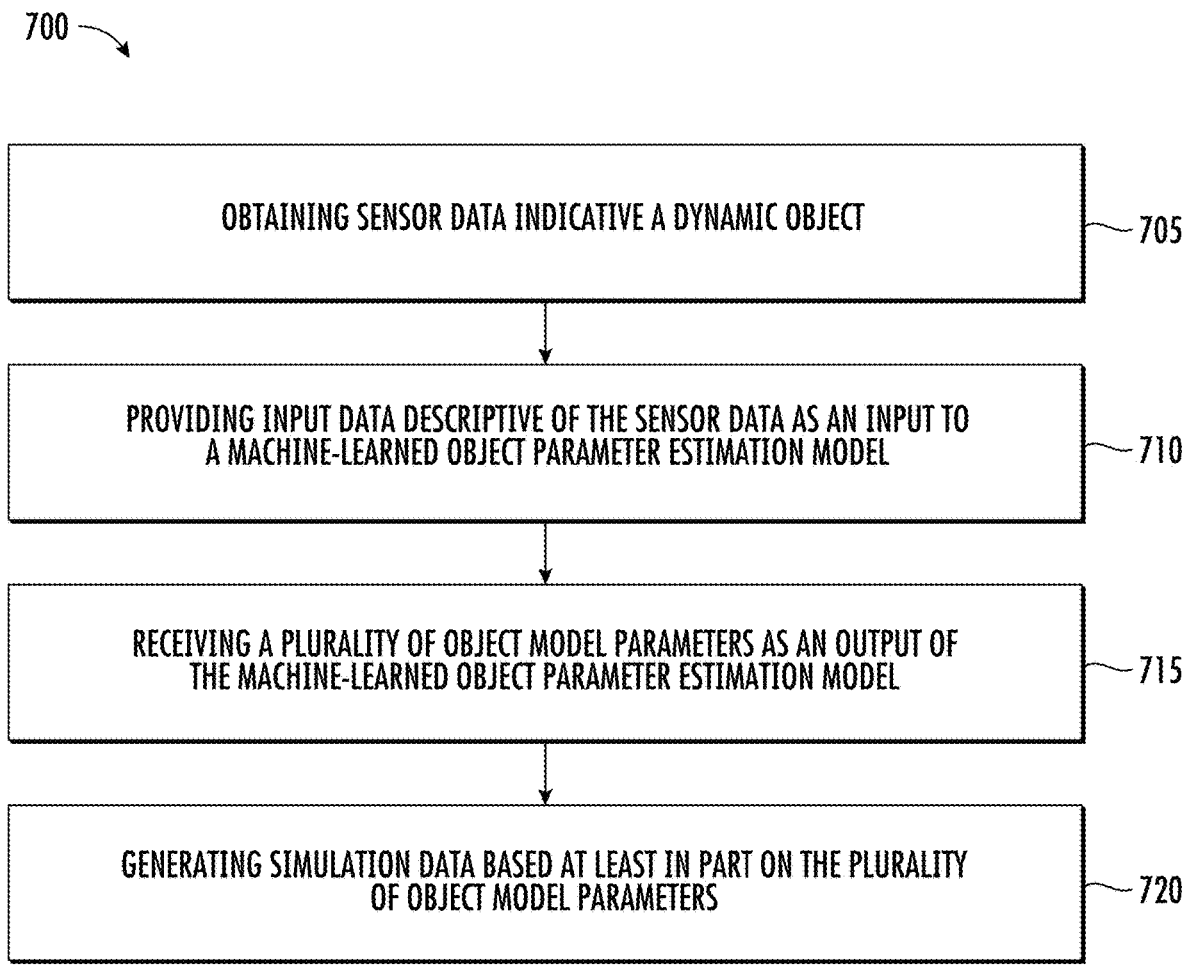
FIG. 7 is a flowchart of a method for generating simulation data, according to some aspects of the present disclosure.

FIG. 7 is a flowchart of a method 700 for generating simulation data, according to some aspects of the present disclosure. One or more portion(s) of the method 700 can be implemented by a computing system that includes one or more computing devices such as, for example, the computing systems described with reference to the other figures (e.g., robotic platform 105, vehicle computing system 210, operations computing system(s) 290A, remote computing system(s) 290B, system 300, etc.). Each respective portion of the method 700 can be performed by any (or any combination) of one or more computing devices. Moreover, one or more portion(s) of the method 700 can be implemented as an algorithm on the hardware components of the device(s) described herein (e.g., as in FIGS. 1-3, 12, etc.), for example, to generate simulation data. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 7 is described with reference to elements/terms described with respect to other systems and figures for exemplary illustrated purposes and is not meant to be limiting. One or more portions of method 700 can be performed additionally, or alternatively, by other systems.

At 705, the method 700 includes obtaining sensor data indicative of a dynamic object such as, for example, a pedestrian or any other non-rigid object. For example, a computing system (e.g., robotic platform 105, vehicle computing system 210, operations computing system(s) 290A, remote computing system(s) 290B, system 300, etc.) can obtain the sensor data indicative of the dynamic object.

At 710, the method 700 includes providing input data descriptive of the sensor data as an input to a machine-learned object parameter estimation model. For example, the computing system can provide input data descriptive of the sensor data as the input to the machine-learned object parameter estimation model.

At 715, the method 700 includes receiving a plurality of object model parameters as an output of the machine-learned object parameter estimation model. For example, the computing system can receive the plurality of object model parameters as the output of the machine-learned object parameter estimation model.

At 720, the method 700 includes generating simulation data based at least in part on the scene representation. For example, the computing system can generate simulation data based at least in part on the plurality of object model parameters, as described herein.

Figure 8:
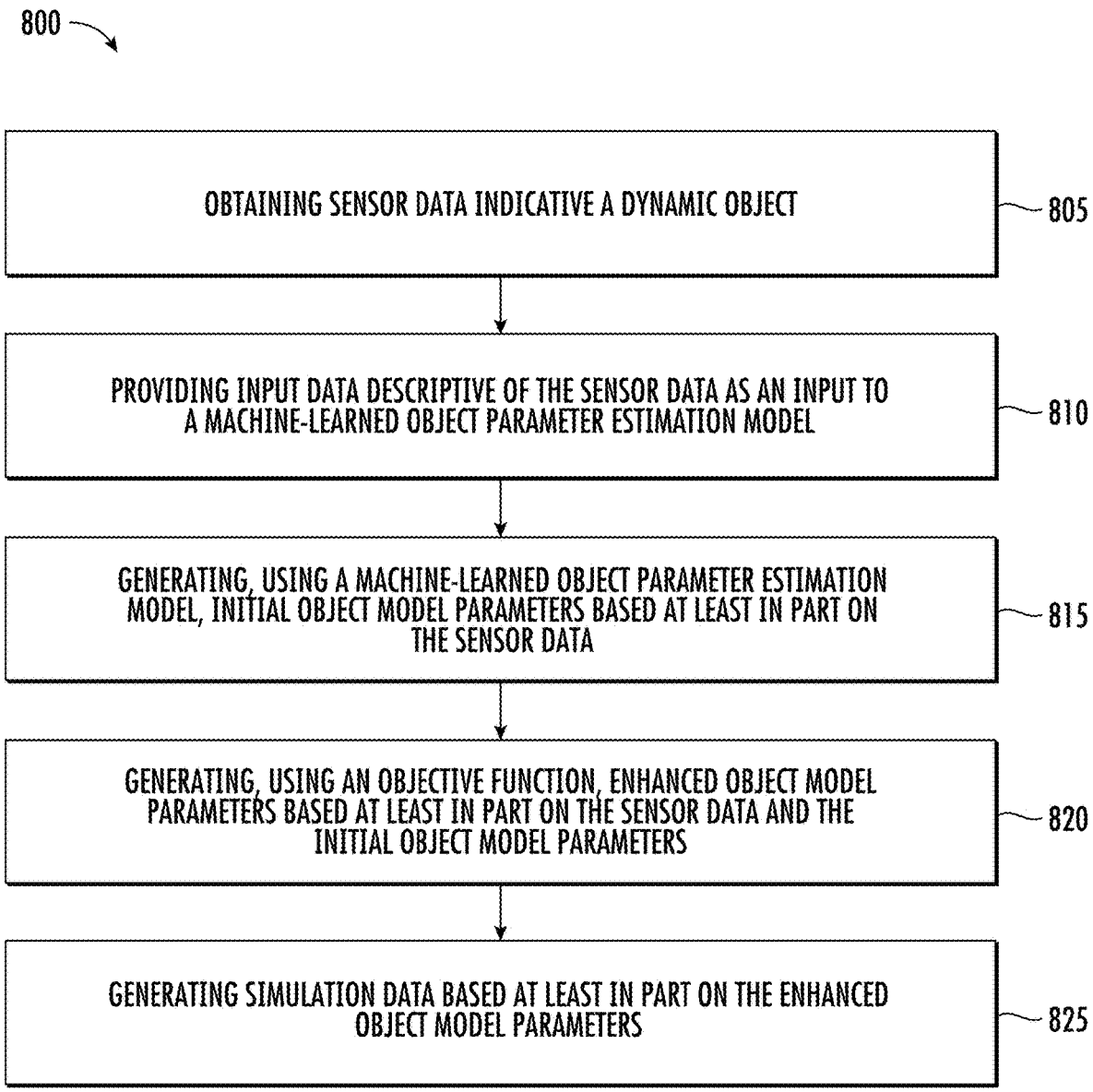
FIG. 8 is another flowchart of a method for generating simulation data, according to some aspects of the present disclosure.

FIG. 8 is another flowchart of a method 800 for generating simulation data according to some aspects of the present disclosure. One or more portion(s) of the method 800 can be implemented by a computing system that includes one or more computing devices such as, for example, the computing systems described with reference to the other figures (e.g., robotic platform 105, vehicle computing system 210, operations computing system(s) 290A, remote computing system(s) 290B, system 300, etc.). Each respective portion of the method 800 can be performed by any (or any combination) of one or more computing devices. Moreover, one or more portion(s) of the method 800 can be implemented as an algorithm on the hardware components of the device(s) described herein (e.g., as in FIGS. 1-3, 12, etc.), for example, to generate simulation data. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 8 is described with reference to elements/terms described with respect to other systems and figures for exemplary illustrated purposes and is not meant to be limiting. One or more portions of method 800 can be performed additionally, or alternatively, by other systems.

At 805, the method 800 includes obtaining sensor data indicative of a dynamic object. For example, a computing system (e.g., robotic platform 105, vehicle computing system 210, operations computing system(s) 290A, remote computing system(s) 290B, system 300, etc.) can obtain the sensor data indicative of the dynamic object. The sensor data can include three-dimensional data and two-dimensional data associated with the dynamic object. The two dimensional data, for example, can include an image frame and the three dimensional data can include a three dimensional point cloud.

At 810, the method 800 includes providing input data descriptive of the sensor data as an input to a machine-learned object parameter estimation model. For example, the computing system can provide input data descriptive of the sensor data as the input to the machine-learned object parameter estimation model. The input data can include processed sensor data. For example, the input data can include a plurality of three-dimensional datapoints associated with a plurality of image features or corresponding depth information from the two- and three-dimensional data.

At 815, the method 800 includes generating, using a machine-learned object parameter estimation model, initial object model parameters based at least in part on the sensor data. For example, the computing system can generate, using the machine-learned object parameter estimation model, the initial object model parameters based at least in part on the sensor data. The plurality of object model parameters can be indicative of at least one of a pose or a shape modification with respect to a template object model. The template object model, for example, can include a linear blend skinning model including a template mesh representation and a template hierarchical set of interconnected bones. As described herein, the initial object model parameters can include at least one of (i) a plurality of joint angles corresponding to the template hierarchical set of interconnected bones, (ii) a plurality of offsets corresponding to the template hierarchical set of interconnected bones, (iii) a plurality of scale factors corresponding to the template hierarchical set of interconnected bones, or (iv) a plurality of deformations corresponding to a template mesh representation. The plurality of object model parameters can represent a three-dimensional dynamic object model indicative of an object pose and an object shape for the dynamic object. In some implementations, the dynamic object can include a pedestrian.

At 820, the method 800 includes generating, using an objective function, enhanced object model parameters based at least in part on the sensor data and the initial object model parameters. For example, the computing system can generate, using the objective function, the enhanced object model parameters based at least in part on the sensor data and the initial object model parameters. The enhanced object model parameters can increase a consistency between the object model parameters and the input data.

At 825, the method 800 includes generating simulation data based at least in part on the enhanced object model parameters. For example, the computing system can generate simulation data based at least in part on the enhanced object model parameters. The simulation data, for example, can include a simulated dynamic object data including a plurality of sets of object model parameters corresponding to a plurality of dynamic objects. Each set of object model parameters, for example, can be indicative of the pose and shape of a dynamic object and at least a portion of an object trajectory.

Figure 9A:
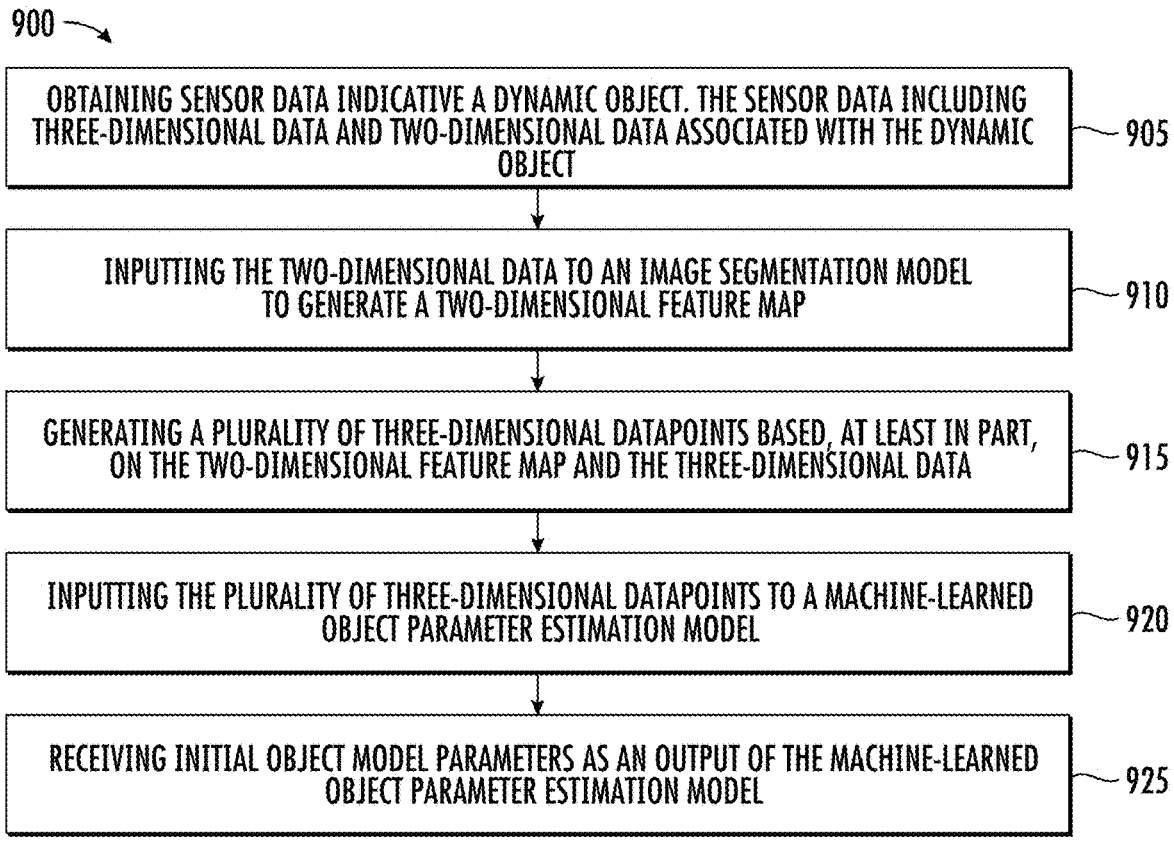
FIGS. 9A-B are flowcharts of methods for generating simulation data through multiple functions, according to some aspects of the present disclosure.
Figure 9B:
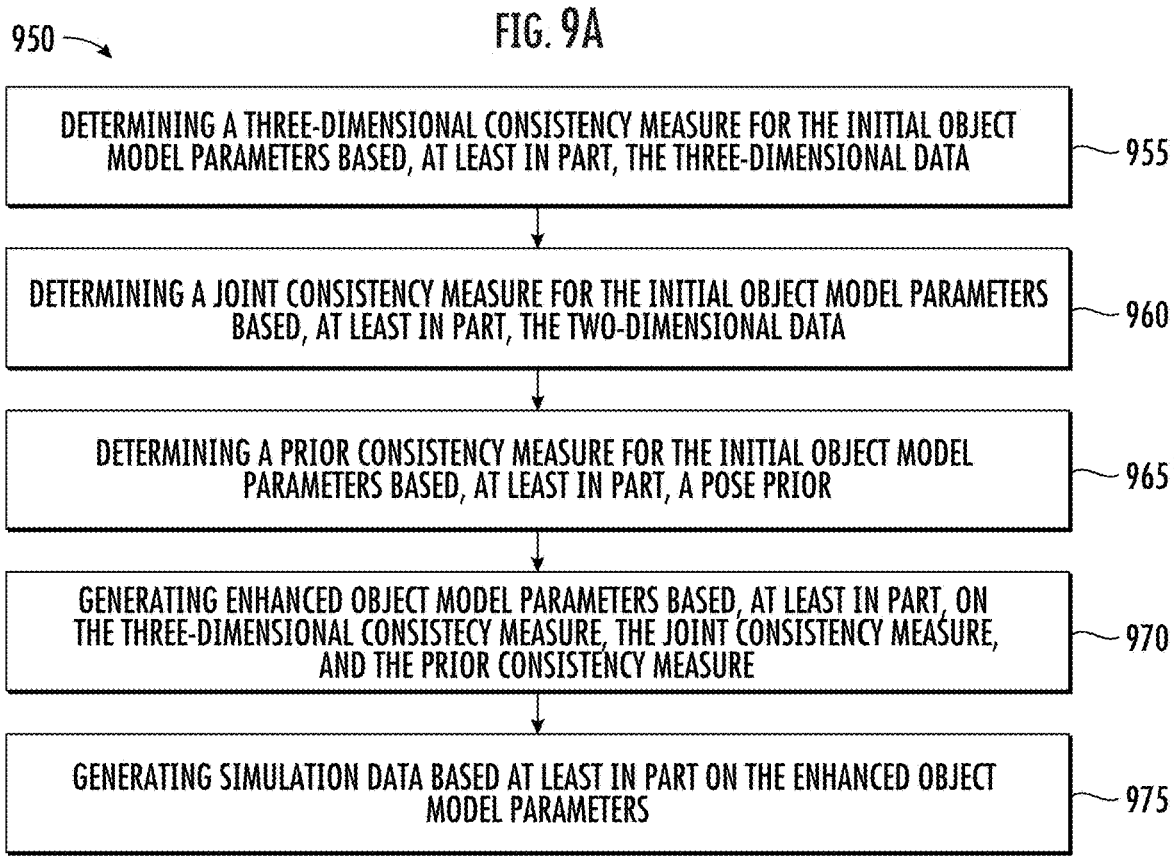

FIGS. 9A-9B are flowcharts of methods 900, 950 for generating simulation data through multiple functions, according to some aspects of the present disclosure. In particular, method 900 describes a method for generating initial object model parameters through a regression network and method 950 describes a method for generating enhanced object model parameters through an objective function. One or more portion(s) of the methods 900, 950 can be implemented by a computing system that includes one or more computing devices such as, for example, the computing systems described with reference to the other figures (e.g., robotic platform 105, vehicle computing system 210, operations computing system(s) 290A, remote computing system(s) 290B, system 300, etc.). Each respective portion of the methods 900, 950 can be performed by any (or any combination) of one or more computing devices. Moreover, one or more portion(s) of the methods 900, 950 can be implemented as an algorithm on the hardware components of the device(s) described herein (e.g., as in FIGS. 1-3, 12, etc.), for example, to generate a simulation data using a self-supervised machine-learned model. FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 9 is described with reference to elements/terms described with respect to other systems and figures for exemplary illustrated purposes and is not meant to be limiting. One or more portions of methods 900, 950 can be performed additionally, or alternatively, by other systems.

At 905, the method 900 includes obtaining sensor data indicative of a dynamic object. For example, a computing system (e.g., robotic platform 105, vehicle computing system 210, operations computing system(s) 290A, remote computing system(s) 290B, system 300, etc.) can obtain the sensor data indicative of the dynamic object. The sensor data includes three-dimensional data and two-dimensional data associated with the dynamic object, as described herein.

At 910, the method 900 includes inputting the two-dimensional data to an image segmentation model to generate a two-dimensional feature map. For example, the computing system can input the two-dimensional data to the image segmentation model to generate the two-dimensional feature map.

At 915, the method 900 includes generating a plurality of three-dimensional datapoints based, at least in part, on the two-dimensional feature map and the three-dimensional data. For example, the computing system can generate the plurality of three-dimensional datapoints based, at least in part, on the two-dimensional feature map and the three-dimensional data.

At 920, the method 900 includes inputting the plurality of three-dimensional datapoints to a machine-learned object parameter estimation model. For example, the computing system can input the plurality of three-dimensional datapoints to the machine-learned object parameter estimation model.

At 925, the method 900 includes receiving initial object model parameters as an output of the machine-learned object parameter estimation model. For example, the computing system can receive the initial object model parameters as the output of the machine-learned object parameter estimation model.

At 955, the method 950 includes determining a three-dimensional consistency measure for the initial object model parameters based, at least in part, the three-dimensional data. For example, a computing system can determine the three-dimensional consistency measure for the initial object model parameters based, at least in part, the three-dimensional data. For example, the computing system can generate a three-dimensional mesh representation of the dynamic object based, at least in part, on the plurality of object model parameters. The computing system can determine an initial simulated three-dimensional point cloud for the dynamic object based, at least in part, on the three-dimensional mesh representation. The three-dimensional consistency measure for the initial object model parameters can be determined by applying an objective function to the initial simulated three-dimensional point cloud and the three-dimensional data. The three-dimensional consistency measure can be indicative of a consistency between the three-dimensional mesh representation of the dynamic object and the three-dimensional data.

At 960, the method 950 includes determining a joint consistency measure for the initial object model parameters based, at least in part, the two-dimensional data. For example, the computing system can determine the joint consistency measure for the initial object model parameters based, at least in part, the two-dimensional data. For example, the computing system can generate a three-dimensional set of interconnected joints representative of the dynamic object based, at least in part, on the plurality of object model parameters. The computing system can determine a two-dimensional set of interconnected joints for the dynamic object based, at least in part, on the three-dimensional set of interconnected joints. The joint consistency measure for the plurality of object model parameters can be determined by applying the objective function to the two-dimensional set of interconnected joints and the two-dimensional data. The joint consistency measure can be indicative of a consistency between the three-dimensional set of interconnected joints representative of the dynamic object and the two-dimensional data.

At 965, the method 950 includes determining a prior consistency measure for the initial object model parameters based, at least in part, a pose prior. For example, the computing system can determine the prior consistency measure for the initial object model parameters based, at least in part, the pose prior. The pose prior, for example, can incorporate prior knowledge of reasonable human poses and shapes to be robust to noisy sensor data.

At 970, the method 950 includes generating enhanced object model parameters based, at least in part, on the three-dimensional consistency measure, the joint consistency measure, and the prior consistency measure. For example, the computing system can generate the enhanced object model parameters based, at least in part, on the three-dimensional consistency measure, the joint consistency measure, and the prior consistency measure. For example, the computing system can modify the plurality of object model parameters based, at least in part, on the three-dimensional consistency measure and the joint consistency measure to generate the plurality of enhanced object model parameters. The plurality of object model parameters can be modified to increase (i) the consistency between the three-dimensional mesh representation of the dynamic object and the three-dimensional data or (ii) the consistency between the three-dimensional set of interconnected joints representative of the dynamic object and the two-dimensional data.

At 975, the method 950 includes generating simulation data based at least in part on the enhanced object model parameters. For example, the computing system can generate the simulation data based at least in part on the enhanced object model parameters.

Figure 10:
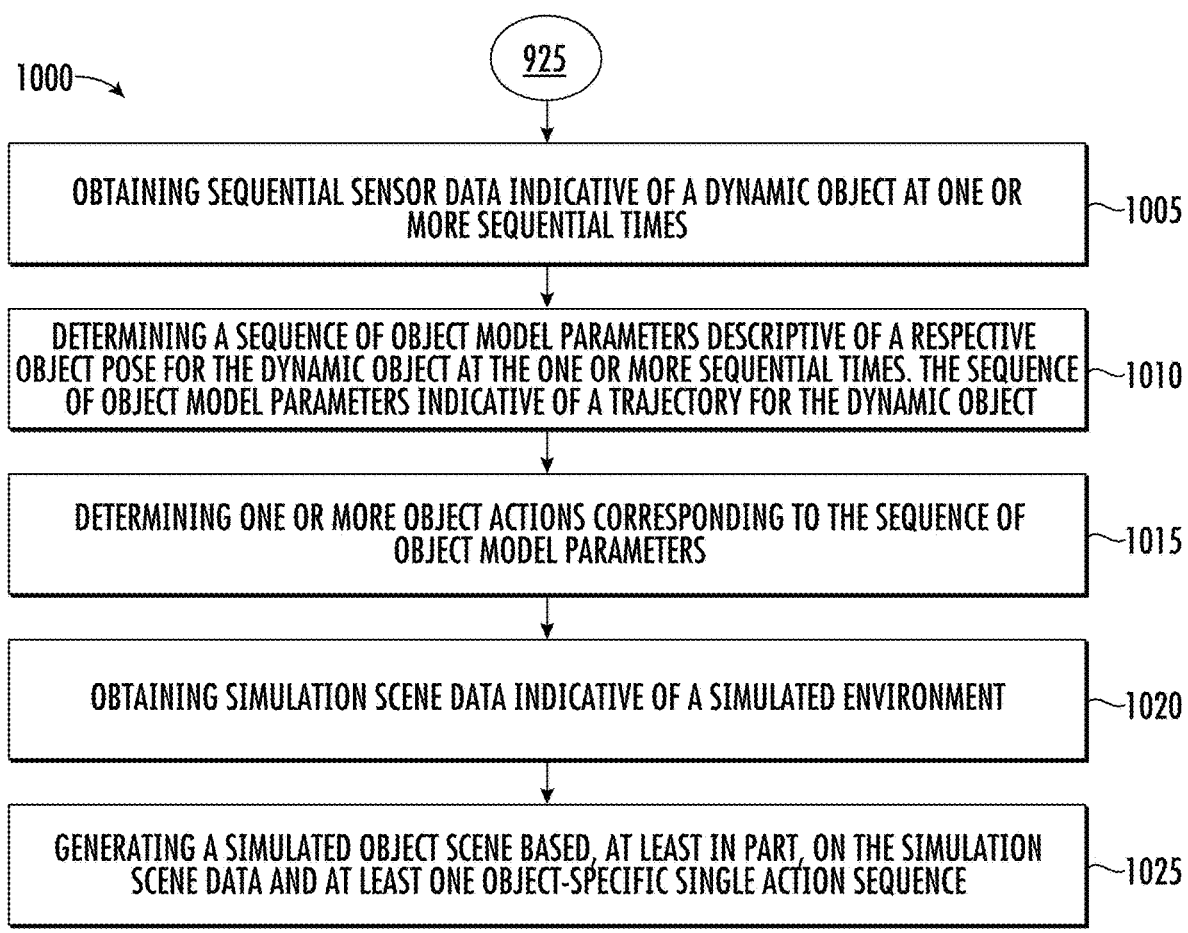
FIG. 10 is a flowchart of a method for generating simulation sequences, according to some aspects of the present disclosure.

FIG. 10 is a flowchart of a method 1000 for generating simulation sequences, according to some aspects of the present disclosure. One or more portion(s) of the method 1000 can be implemented by a computing system that includes one or more computing devices such as, for example, the computing systems described with reference to the other figures (e.g., robotic platform 105, vehicle computing system 210, operations computing system(s) 290A, remote computing system(s) 290B, system 300, etc.). Each respective portion of the method 1000 can be performed by any (or any combination) of one or more computing devices. Moreover, one or more portion(s) of the method 1000 can be implemented as an algorithm on the hardware components of the device(s) described herein (e.g., as in FIGS. 1-3, 12, etc.), for example, to generate simulation sequences. FIG. 10 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 10 is described with reference to elements/terms described with respect to other systems and figures for exemplary illustrated purposes and is not meant to be limiting. One or more portions of method 1000 can be performed additionally, or alternatively, by other systems.

The method 1000 can begin after 1025 of method 1000 in which a plurality of initial object model parameters are received as an output of the machine-learned object parameter estimation model. The two- and three-dimensional data can correspond to a first time. In such a case, the plurality of initial object model parameters can correspond to the first time.

At 1005, the method 1000 includes obtaining sequential sensor data indicative of a dynamic object at one or more sequential times. For example, a computing system (e.g., robotic platform 105, vehicle computing system 210, operations computing system(s) 290A, remote computing system(s) 290B, system 300, etc.) can obtain the sequential sensor data indicative of the dynamic object at the one or more sequential times. The sequential times, for example, can include one or more second times. The second time(s) can be subsequent to or precede the first time.

At 1010, the method 1000 includes determining a sequence of object model parameters descriptive of a respective object pose for the dynamic object at the one or more sequential times. For example, the computing system can determine the sequence of object model parameters descriptive of the respective object pose for the dynamic object at the one or more sequential times. The sequence of object model parameters can be indicative of a trajectory for the dynamic object.

At 1015, the method 1000 includes determining one or more object actions corresponding to the sequence of object model parameters. For example, the computing system can determine the one or more object actions corresponding to the sequence of object model parameters. The computing system can generate one or more single action sequences from the sequence of object model parameters based, at least in part, on the sequence of object model parameters and the one or more object actions corresponding to the sequence of object model parameters. The one or more single action sequences can be stored in a dynamic object database including a plurality of object-specific single action sequences descriptive of the plurality of dynamic objects.

At 1020, the method 1000 includes obtaining simulation scene data indicative of a simulated environment. For example, the computing system can obtain the simulation scene data indicative of the simulated environment.

At 1025, the method 1000 includes generating a simulated object scene based, at least in part, on the simulation scene data and at least one object-specific single action sequence. For example, the computing system can generate the simulated object scene based, at least in part, on the simulation scene data and the at least one object-specific single action sequence. For example, the computing system can obtain at least one of the plurality of object-specific single action sequences from the dynamic object database. The at least one object-specific single action sequence can be indicative of one or more movements of the respective dynamic object. The computing system can generate the simulated object scene based, at least in part, on the simulation scene data and the at least one object-specific single action sequence.

Figure 11:
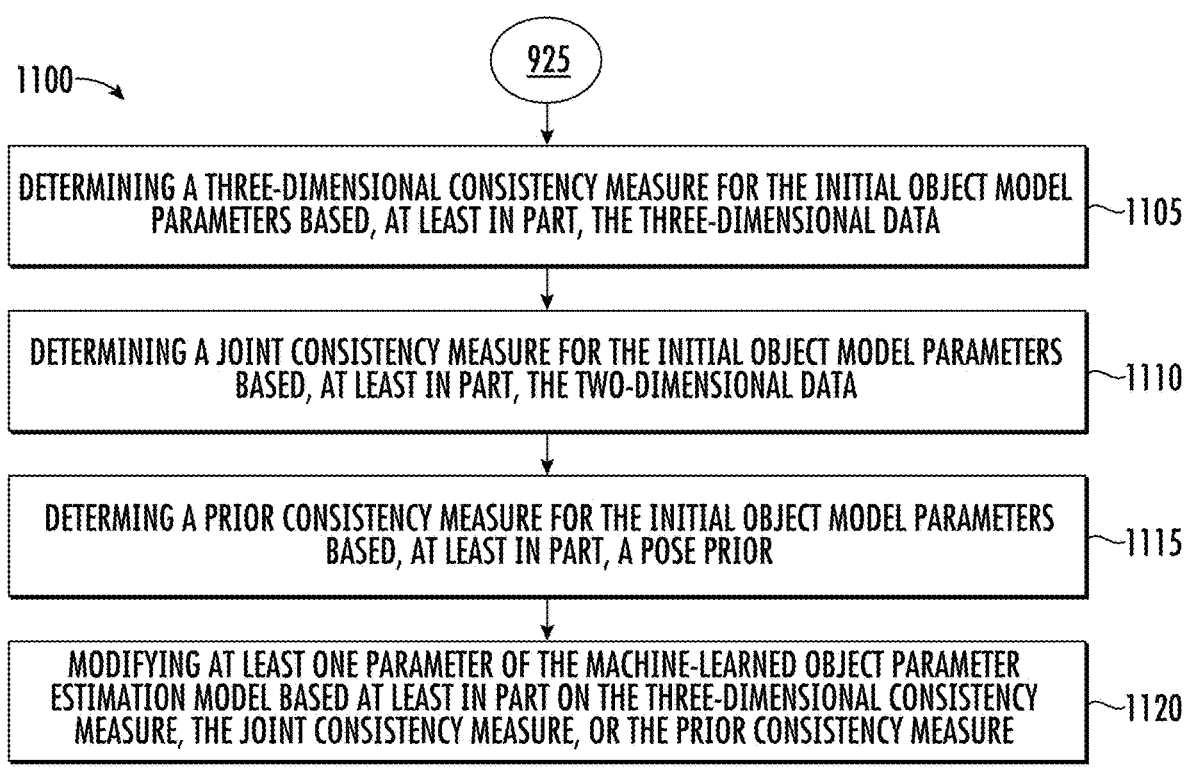
FIG. 11 is a flowchart of a method for training an example machine-learned object parameter estimation model, according to some aspects of the present disclosure.

FIG. 11 is a flowchart of a method 1100 for training an example machine-learned object parameter estimation model, according to some aspects of the present disclosure. One or more portion(s) of the method 1100 can be implemented by a computing system that includes one or more computing devices such as, for example, the computing systems described with reference to the other figures (e.g., robotic platform 105, vehicle computing system 210, operations computing system(s) 290A, remote computing system(s) 290B, system 300, etc.). Each respective portion of the method 1100 can be performed by any (or any combination) of one or more computing devices. Moreover, one or more portion(s) of the method 1100 can be implemented as an algorithm on the hardware components of the device(s) described herein (e.g., as in FIGS. 1-3, 10, etc.), for example, to train the example machine-learned object parameter estimation model. FIG. 11 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 11 is described with reference to elements/terms described with respect to other systems and figures for exemplary illustrated purposes and is not meant to be limiting. One or more portions of method 1100 can be performed additionally, or alternatively, by other systems.

The method 1100 can begin after 925 of method 900 in which a plurality of initial object model parameters are received as an output of the machine-learned object parameter estimation model.

At 1105, the method 1100 includes determining a three-dimensional consistency measure for the initial object model parameters based, at least in part, on the three-dimensional data. For example, a computing system (e.g., robotic platform 105, vehicle computing system 210, operations computing system(s) 290A, remote computing system(s) 290B, system 300, etc.) can determine the three-dimensional consistency measure for the initial object model parameters based, at least in part, on the three-dimensional data.

At 1110, the method 1100 includes determining a joint consistency measure for the initial object model parameters based, at least in part, the two-dimensional data. For example, the computing system can determine the joint consistency measure for the initial object model parameters based, at least in part, the two-dimensional data.

At 1115, the method 1100 includes determining a prior consistency measure for the initial object model parameters based, at least in part, a pose prior. For example, the computing system can determine the prior consistency measure for the initial object model parameters based, at least in part, the pose prior.

Figure 12:
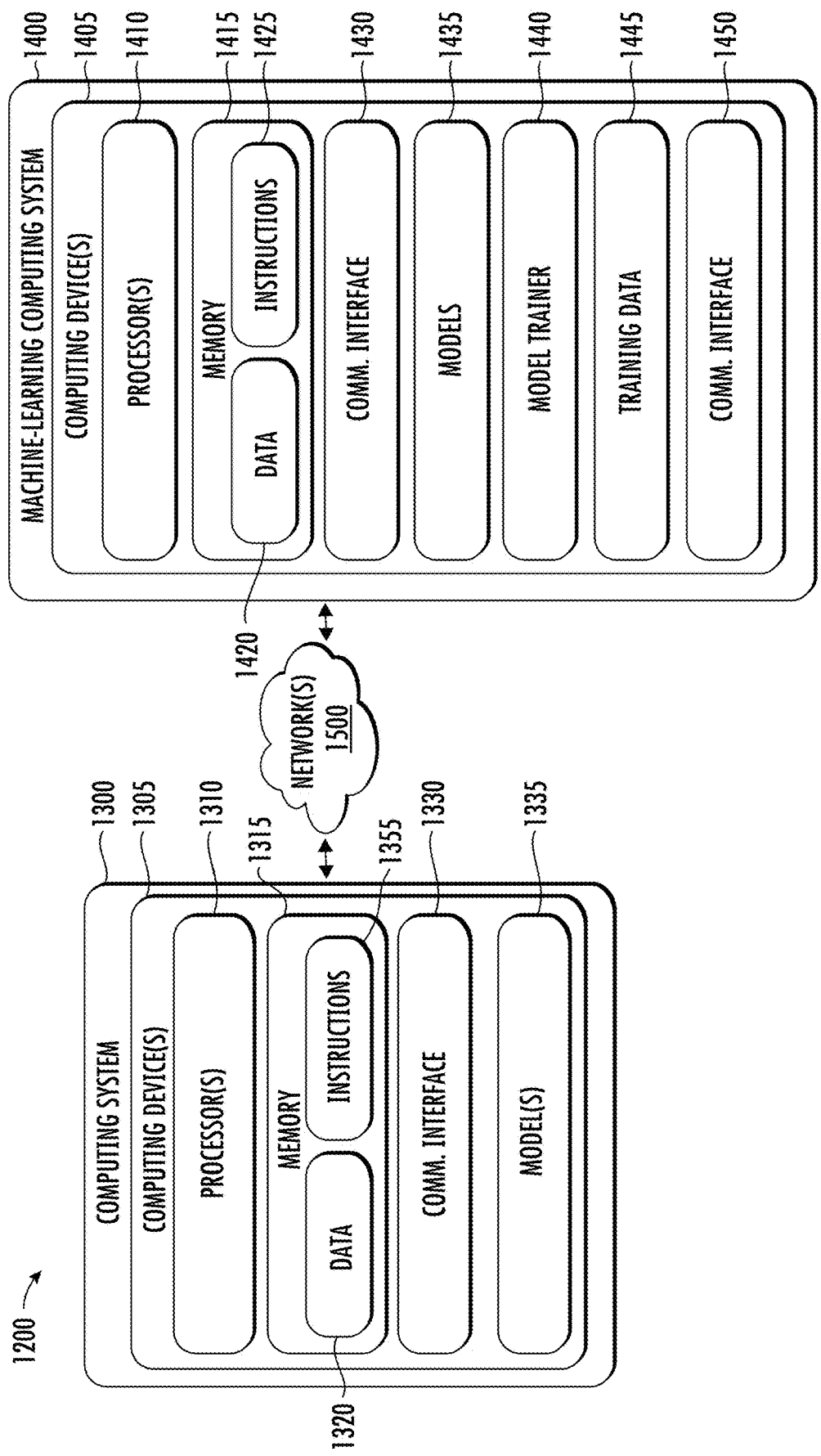
FIG. 12 is a block diagram of a computing system, according to some embodiments of the present disclosure.

At 1120, the method 1100 includes modifying at least one parameter of the machine-learned object parameter estimation model based at least in part on the three-dimensional consistency measure, the joint consistency measure, or the prior consistency measure. For example, the computing system can modify at least one parameter of the machine-learned object parameter estimation model based at least in part on the three-dimensional consistency measure, the joint consistency measure, or the prior consistency measure FIG. 12 is a block diagram of a computing system 1200, according to some embodiments of the present disclosure. The example system 1200 includes a computing system 1500 and a machine learning computing system 1400 that are communicatively coupled over one or more networks 1500.

In some implementations, the computing system 1300 can perform one or more observation tasks such as, for example, by obtaining sensor data (e.g., two-dimensional, three-dimensional, etc.) associated with a dynamic object. In some implementations, the computing system 1300 can be included in a robotic platform. For example, the computing system 1300 can be on-board an autonomous vehicle. In other implementations, the computing system 1300 is not located on-board a robotic platform. The computing system 1300 can include one or more distinct physical computing devices 1305.

The computing system 1300 (or one or more computing device(s) 1305 thereof) can include one or more processors 1310 and a memory 1315. The one or more processors 1310 can be any suitable processing device (e.g., a processor core, a microprocessor, an ASIC, a FPGA, a controller, a microcontroller, etc.) and can be one processor or a plurality of processors that are operatively connected. The memory 1315 can include one or more non-transitory computer-readable storage media, such as RAM, ROM, EEPROM, EPROM, one or more memory devices, flash memory devices, etc., and combinations thereof.

The memory 1315 can store information that can be accessed by the one or more processors 1310. For instance, the memory 1315 (e.g., one or more non-transitory computer-readable storage mediums, memory devices) can store data 1340 that can be obtained, received, accessed, written, manipulated, created, or stored. The data 1340 can include, for instance, sensor data, two-dimensional data, three-dimensional, image data, LiDAR data, object model parameters, simulation data or any other data or information described herein. In some implementations, the computing system 1300 can obtain data from one or more memory device(s) that are remote from the computing system 1300.

The memory 1315 can also store computer-readable instructions 1345 that can be executed by the one or more processors 1340. The instructions 1345 can be software written in any suitable programming language or can be implemented in hardware. Additionally, or alternatively, the instructions 1345 can be executed in logically or virtually separate threads on processor(s) 1310.

For example, the memory 1315 can store instructions 1345 that when executed by the one or more processors 1310 cause the one or more processors 1310 (the computing system 1300) to perform any of the operations, functions, or methods/processes described herein, including, for example, obtaining sensor data, generating object model parameters, generating simulation data, etc.

According to an aspect of the present disclosure, the computing system 1300 can store or include one or more machine-learned models 1335. As examples, the machine-learned models 1335 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks.

In some implementations, the computing system 1300 can receive the one or more machine-learned models 1335 from the machine learning computing system 1400 over network(s) 1500 and can store the one or more machine-learned models 1335 in the memory 1315. The computing system 1300 can then use or otherwise implement the one or more machine-learned models 1335 (e.g., by processor(s) 1310). In particular, the computing system 1300 can implement the machine learned model(s) 1335 to generate initial object model parameters, simulation data including dynamic objects, etc.

The machine learning computing system 1400 can include one or more computing devices 1405. The machine learning computing system 1400 can include one or more processors 1410 and a memory 1415. The one or more processors 1410 can be any suitable processing device (e.g., a processor core, a microprocessor, an ASIC, a FPGA, a controller, a microcontroller, etc.) and can be one processor or a plurality of processors that are operatively connected. The memory 1415 can include one or more non-transitory computer-readable storage media, such as RAM, ROM, EEPROM, EPROM, one or more memory devices, flash memory devices, etc., and combinations thereof.

The memory 1415 can store information that can be accessed by the one or more processors 1410. For instance, the memory 1415 (e.g., one or more non-transitory computer-readable storage mediums, memory devices) can store data 1420 that can be obtained, received, accessed, written, manipulated, created, or stored. The data 1420 can include, for instance, sensor data, two-dimensional data, three-dimensional, image data, LiDAR data, object model parameters, simulation data, data associated with models, or any other data or information described herein. In some implementations, the machine learning computing system 1400 can obtain data from one or more memory device(s) that are remote from the machine learning computing system 1400.

The memory 1410 can also store computer-readable instructions 1425 that can be executed by the one or more processors 1410. The instructions 1425 can be software written in any suitable programming language or can be implemented in hardware. Additionally, or alternatively, the instructions 1425 can be executed in logically or virtually separate threads on processor(s) 1410.

For example, the memory 1415 can store instructions 1425 that when executed by the one or more processors 1410 cause the one or more processors 1410 (the computing system) to perform any of the operations or functions described herein, including, for example, training a machine-learned object parameter estimation model, generating simulation data, etc.

In some implementations, the machine learning computing system 1400 includes one or more server computing devices. If the machine learning computing system 1400 includes multiple server computing devices, such server computing devices can operate according to various computing architectures, including, for example, sequential computing architectures, parallel computing architectures, or some combination thereof.

In addition, or alternatively to the model(s) 1435 at the computing system 1300, the machine learning computing system 1400 can include one or more machine-learned models 1435. As examples, the machine-learned models 1435 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks.

In some implementations, the machine learning computing system 1400 or the computing system 1300 can train the machine-learned models 1335 or 1435 through use of a model trainer 1440. The model trainer 1440 can train the machine-learned models 1335 or 1435 using one or more training or learning algorithms. One example training technique is backwards propagation of errors. In some implementations, the model trainer 1440 can perform supervised training techniques using a set of labeled training data. In other implementations, the model trainer 1440 can perform unsupervised training techniques using a set of unlabeled training data. By way of example, the model trainer 1440 can train the machine-learned object parameter estimation model through unsupervised energy minimization training techniques using the objective function described herein. The model trainer 1440 can perform a number of generalization techniques to improve the generalization capability of the models being trained. Generalization techniques include weight decays, dropouts, or other techniques.

The computing system 1300 and the machine learning computing system 1400 can each include a communication interface 1330 and 1450, respectively. The communication interfaces 1330/1450 can be used to communicate with one or more systems or devices, including systems or devices that are remotely located from the computing system 1300 and the machine learning computing system 1400. A communication interface 1330/1450 can include any circuits, components, software, etc. for communicating with one or more networks (e.g., 1500). In some implementations, a communication interface 1330/1450 can include, for example, one or more of a communications controller, receiver, transceiver, transmitter, port, conductors, software or hardware for communicating data.

The network(s) 1500 can be any type of network or combination of networks that allows for communication between devices. In some embodiments, the network(s) can include one or more of a local area network, wide area network, the Internet, secure network, cellular network, mesh network, peer-to-peer communication link or some combination thereof and can include any number of wired or wireless links. Communication over the network(s) 1500 can be accomplished, for instance, through a network interface using any type of protocol, protection scheme, encoding, format, packaging, etc.

FIG. 10 illustrates one example computing system 1200 that can be used to implement the present disclosure. Other computing systems can be used as well. For example, in some implementations, the computing system 1300 can include the model trainer 1440 and the training dataset 1445. In such implementations, the machine-learned models 1440 can be both trained and used locally at the computing system 1300. As another example, in some implementations, the computing system 1300 is not connected to other computing systems.

In addition, components illustrated or discussed as being included in one of the computing systems 1300 or 1400 can instead be included in another of the computing systems 1300 or 1400. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein.

What is claimed is:

1. A computing system comprising:
   one or more processors; and
   one or more computer-readable medium storing instructions that when executed by the one or more processors cause the computing system to perform operations, the operations comprising:
   obtaining sensor data indicative of a dynamic object, wherein;
      the sensor data comprises three-dimensional data corresponding to a first time and two-dimensional data corresponding to the first time, and
      the three-dimensional data and two-dimensional data are associated with the dynamic object;
   providing input data descriptive of the sensor data indicative of the dynamic object as an input to a machine-learned object parameter estimation model;
   receiving as an output of the machine-learned object parameter estimation model, in response to receipt of the input data, a plurality of object model parameters indicative of at least one of a pose or a shape modification with respect to a template object model, wherein:
      the plurality of object model parameters correspond to the first time, and
      the plurality of object model parameters represent a three-dimensional dynamic object model indicative of an object pose and an object shape for the dynamic object;
   obtaining sequential sensor data indicative of the dynamic object at one or more second times;

determining a sequence of object model parameters descriptive of a respective object pose for the dynamic object at the one or more second times, wherein the sequence of object model parameters is indicative of a trajectory of the dynamic object, wherein the trajectory is indicative of at least one or more velocities of the dynamic object; and generating at least a portion of simulation data based, at least in part, on the sequence of object model parameters.

2. The computing system of claim 1, wherein the operations further comprise:

generating a three-dimensional mesh representation of the dynamic object based, at least in part, on the plurality of object model parameters;

determining an initial simulated three-dimensional point cloud for the dynamic object based, at least in part, on the three-dimensional mesh representation; and generating a plurality of enhanced object model parameters based, at least in part, on the initial simulated three-dimensional point cloud, the three-dimensional data, and an objective function.

3. The computing system of claim 2, wherein the operations further comprise:

generating a three-dimensional set of interconnected joints representative of the dynamic object based, at least in part, on the plurality of object model parameters;

determining a two-dimensional set of interconnected joints for the dynamic object based, at least in part, on the three-dimensional set of interconnected joints; and generating the plurality of enhanced object model parameters based, at least in part, on the two-dimensional set of interconnected joints, the two-dimensional data, and the objective function.

4. The computing system of claim 3, wherein generating the plurality of enhanced object model parameters based, at least in part, on the objective function comprises:

applying the objective function to the initial simulated three-dimensional point cloud and the three-dimensional data to determine a three-dimensional consistency measure for the plurality of object model parameters, wherein the three-dimensional consistency measure is indicative of a consistency between the three-dimensional mesh representation of the dynamic object and the three-dimensional data;

applying the objective function to the two-dimensional set of interconnected joints and the two-dimensional data to determine a joint consistency measure for the plurality of object model parameters, wherein the joint consistency measure is indicative of a consistency between the three-dimensional set of interconnected joints representative of the dynamic object and the two-dimensional data; and modifying the plurality of object model parameters based, at least in part, on the three-dimensional consistency measure and the joint consistency measure to generate the plurality of enhanced object model parameters, wherein the plurality of object model parameters are modified to increase (i) the consistency between the three-dimensional mesh representation of the dynamic object and the three-dimensional data and (ii) the consistency between the three-dimensional set of interconnected joints representative of the dynamic object and the two-dimensional data.

5. The computing system of claim 4, wherein the machine-learned object parameter estimation model is trained based, at least in part, on the three-dimensional consistency measure and the joint consistency measure.

6. The computing system of claim 1, wherein the two dimensional data comprises an image frame corresponding to the first time, and wherein the three dimensional data comprises a three dimensional point cloud corresponding to the first time.

7. The computing system of claim 1, wherein the simulation data comprises a plurality of object-specific single action sequences descriptive of a plurality of dynamic objects, and wherein generating at least the portion of the simulation data based, at least in part, on the plurality of object model parameters comprises:

determining one or more object actions corresponding to the sequence of object model parameters based, at least in part, on the one or more velocities of the dynamic object;

generating one or more single action sequences from the sequence of object model parameters based, at least in part, on the sequence of object model parameters and the one or more object actions corresponding to the sequence of object model parameters; and storing the one or more single action sequences in a dynamic object database comprising the plurality of object-specific single action sequences descriptive of the plurality of dynamic objects.

8. The computing system of claim 7, wherein the simulation data further comprises a simulated object scene indicative of one or more movements of a respective dynamic object within a simulated environment, and wherein generating at least the portion of the simulation data based, at least in part, on the plurality of object model parameters further comprises:

obtaining simulation scene data indicative of the simulated environment;

obtaining at least one of the plurality of object-specific single action sequences from the dynamic object database, wherein the at least one object-specific single action sequence is indicative of the one or more movements of the respective dynamic object; and generating the simulated object scene based, at least in part, on the simulation scene data and the at least one object-specific single action sequence.

9. The computing system of claim 1, wherein the template object model is a linear blend skinning model comprising a template mesh representation and a template hierarchical set of interconnected bones.

10. The computing system of claim 9, wherein the plurality of model parameters comprise at least one of (i) a plurality of joint angles corresponding to the template hierarchical set of interconnected bones, (ii) a plurality of offsets corresponding to the template hierarchical set of interconnected bones, (iii) a plurality of scale factors corresponding to the template hierarchical set of interconnected bones, or (iv) a plurality of deformations corresponding to the template mesh representation.

11. The computing system of claim 1, wherein the dynamic object is a pedestrian.

12. A computer-implemented method comprising:

obtaining sensor data indicative of a dynamic object, wherein:

the sensor data comprises three-dimensional data corresponding to a first time and two-dimensional data corresponding to the first time, and the three-dimensional data and two-dimensional data are associated with the dynamic object;

providing input data descriptive of the sensor data indicative of the dynamic object as an input to a machine-learned object parameter estimation model;

receiving as an output of the machine-learned object parameter estimation model, in response to receipt of the input data, a plurality of object model parameters indicative of at least one of a pose or a shape modification with respect to a template object model, wherein:

the plurality of object model parameters correspond to the first time, and the plurality of object model parameters represent a three-dimensional dynamic object model indicative of an object pose and an object shape for the dynamic object;

obtaining sequential sensor data indicative of the dynamic object at one or more second times;

determining a sequence of object model parameters descriptive of a respective object pose for the dynamic object at the one or more second times, wherein the sequence of object model parameters is indicative of a trajectory of the dynamic object, wherein the trajectory is indicative of at least one or more velocities of the dynamic object; and generating at least a portion of simulation data based, at least in part, on the sequence of object model parameters.

13. The computer-implemented method of claim 12, further comprising:

generating a three-dimensional mesh representation of the dynamic object based, at least in part, on the plurality of object model parameters;

determining an initial simulated three-dimensional point cloud for the dynamic object based, at least in part, on the three-dimensional mesh representation; and generating a plurality of enhanced object model parameters based, at least in part, on the initial simulated three-dimensional point cloud, the three-dimensional data, and an objective function.

14. The computer-implemented method of claim 13, further comprising:

generating a three-dimensional set of interconnected joints representative of the dynamic object based, at least in part, on the plurality of object model parameters;

determining a two-dimensional set of interconnected joints for the dynamic object based, at least in part, on the three-dimensional set of interconnected joints; and generating the plurality of enhanced object model parameters based, at least in part, on the two-dimensional set of interconnected joints, the two-dimensional data, and the objective function.

15. The computer-implemented method of claim 14, wherein generating the plurality of enhanced object model parameters based, at least in part, on the objective function comprises:

applying the objective function to the initial simulated three-dimensional point cloud and the three-dimensional data to determine a three-dimensional consistency measure for the plurality of object model parameters, wherein the three-dimensional consistency measure is indicative of a consistency between the three-dimensional mesh representation of the dynamic object and the three-dimensional data;

applying the objective function to the two-dimensional set of interconnected joints and the two-dimensional data to determine a joint consistency measure for the plurality of object model parameters, wherein the joint consistency measure is indicative of a consistency between the three-dimensional set of interconnected joints representative of the dynamic object and the two-dimensional data; and modifying the plurality of object model parameters based, at least in part, on the three-dimensional consistency measure and the joint consistency measure to generate the plurality of enhanced object model parameters, wherein the plurality of object model parameters are modified to increase (i) the consistency between the three-dimensional mesh representation of the dynamic object and the three-dimensional data and (ii) the consistency between the three-dimensional set of interconnected joints representative of the dynamic object and the two-dimensional data.

16. The computer-implemented method of claim 15, wherein modifying the plurality of object model parameters based, at least in part, on the three-dimensional consistency measure and the joint consistency measure to generate the plurality of enhanced object model parameters, comprises:

performing energy minimization over the plurality of object model parameters to generate the plurality of enhanced object model parameters.

17. One or more tangible, non-transitory, computer readable media that store instructions that when executed by one or more processors cause the one or more processors to perform operations comprising:

obtaining sensor data indicative of a dynamic object, wherein:

the sensor data comprises three-dimensional data corresponding to a first time and two-dimensional data corresponding to the first time, and the three-dimensional data and two-dimensional data are associated with the dynamic object;

providing input data descriptive of the sensor data indicative of the dynamic object as an input to a machine-learned object parameter estimation model;

receiving as an output of the machine-learned object parameter estimation model, in response to receipt of the input data, a plurality of object model parameters indicative of at least one of a pose or a shape modification with respect to a template object model, wherein:

the plurality of object model parameters correspond to the first time, and the plurality of object model parameters represent a three-dimensional dynamic object model indicative of an object pose and an object shape for the dynamic object;

obtaining sequential sensor data indicative of the dynamic object at one or more second times;

determining a sequence of object model parameters descriptive of a respective object pose for the dynamic object at the one or more second times, wherein the sequence of object model parameters is indicative of a trajectory of the dynamic object, wherein the trajectory is indicative of at least one or more velocities of the dynamic object; and generating at least a portion of simulation data based, at least in part, on the sequence of object model parameters.

18. The one or more tangible, non-transitory, computer readable media of claim 17, wherein the simulation data comprises a plurality of object-specific single action sequences descriptive of a plurality of dynamic objects, and wherein generating at least the portion of the simulation data based, at least in part, on the plurality of object model parameters comprises:
- determining one or more object actions corresponding to the sequence of object model parameters based, at least in part, on the one or more velocities of the dynamic object;
- generating one or more single action sequences from the sequence of object model parameters based, at least in part, on the sequence of object model parameters and the one or more object actions corresponding to the sequence of object model parameters; and
- storing the one or more single action sequences in a dynamic object database comprising the plurality of object-specific single action sequences descriptive of the plurality of dynamic objects.

\* \* \* \* \*